United States Patent
Lee

(10) Patent No.: US 12,282,424 B2
(45) Date of Patent: Apr. 22, 2025

(54) STORAGE DEVICE FOR MANAGING DATA BASED ON TIME INFORMATION AND OPERATION METHOD THEREOF

(71) Applicant: Samsung Electronics Co., Ltd., Suwon-si (KR)

(72) Inventor: Seung-Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 18/238,858

(22) Filed: Aug. 28, 2023

(65) Prior Publication Data

US 2024/0241825 A1 Jul. 18, 2024

(30) Foreign Application Priority Data

Jan. 13, 2023 (KR) .......................... 10-2023-0005729

(51) Int. Cl.
*G06F 12/00* (2006.01)
*G06F 12/02* (2006.01)

(52) U.S. Cl.
CPC .... *G06F 12/0292* (2013.01); *G06F 2212/202* (2013.01)

(58) Field of Classification Search
None
See application file for complete search history.

(56) References Cited

U.S. PATENT DOCUMENTS

| | | |
|---|---|---|
| 9,450,761 B2 | 9/2016 | Minamimoto et al. |
| 11,137,980 B1 | 10/2021 | Animesh et al. |
| 2020/0242025 A1* | 7/2020 | Du ...................... G11C 11/4074 |
| 2022/0209958 A1 | 6/2022 | Vieyra |
| 2022/0222215 A1 | 7/2022 | Kumarasamy et al. |
| 2022/0271948 A1 | 8/2022 | Omori et al. |

FOREIGN PATENT DOCUMENTS

| | | |
|---|---|---|
| JP | 2022106690 A | 7/2022 |
| KR | 102365254 B1 | 2/2022 |

OTHER PUBLICATIONS

Cisco Annual Internet Report, 2018-2023.
J.R. Park & S.S. Choi, Web 3.0 Reboot: Issues and Prospects, Electronics and Telecommunications Trends vol. 37 No. 2, Apr. 2022.

* cited by examiner

*Primary Examiner* — Midys Rojas
(74) *Attorney, Agent, or Firm* — Muir Patent Law, PLLC

(57) ABSTRACT

Disclosed is an operation method of a storage device which includes receiving a record including owner data and time information, mapping the time information included in the received record to a physical address of a non-volatile memory, storing part or all of the record including the owner data to the mapped physical address of the non-volatile memory, receiving an access request including a time period, generating output data by performing data processing with respect to owner data corresponding to the time period, and transmitting the output data to the outside.

20 Claims, 19 Drawing Sheets

FIG. 10

| LV1 | LV2 | LVn | Physical Address | |
|---|---|---|---|---|
| T11 | T21 | Tn1 | PA21 | PA22 |
| | | Tn2 | PA23 | PA24 |
| | T22 | Tn4 | PA25 | PA26 |
| | | Tn6 | PA27 | - |
| | | Tn7 | PA28 | PA29 |
| | T23 | Tn8 | | |
| | | Tn9 | | |
| | T24 | | | |
| T12 | T25 | | ⋮ | ⋮ |
| | ⋮ | ⋮ | | |

T2P

STORAGE DEVICE FOR MANAGING DATA BASED ON TIME INFORMATION AND OPERATION METHOD THEREOF

CROSS-REFERENCE TO RELATED APPLICATIONS

This application claims priority under 35 U.S.C. § 119 to Korean Patent Application No. 10-2023-0005729 filed on Jan. 13, 2023, in the Korean Intellectual Property Office, the disclosure of which is incorporated by reference herein in its entirety.

BACKGROUND

Embodiments of the present disclosure described herein relate to a storage device, and more particularly, relate to a storage controller managing data based on time information, a storage device including the same, and an operation method of the storage device.

A storage device may include a storage controller and a non-volatile memory and may stably store a large amount of data generated in a digital environment.

The number of electronic devices connected to a network and the amount of personal data generated in an electronic device are exponentially increasing. The personal data generated in the electronic device may be generated sequentially over time in compliance with a given format. The personal data that are generated sequentially over time may be accumulated in the storage device and may be utilized for machine learning or as statistical data.

As the size of personal data stored in the storage device increases, the burden of processing of the user side where the personal data are utilized may increase. Accordingly, there is required a scheme capable of reducing the burden of processing of the user side where the personal data are utilized.

SUMMARY

Embodiments of the present disclosure provide a storage device managing personal data generated sequentially over time based on time information and an operation method thereof.

Embodiments of the present disclosure provide a storage device alleviating a burden of an operation to be performed on the outside and an operation method thereof.

According to an embodiment, an operation method of a storage device may include receiving a record including owner identifier information, tag information for classifying owner data, time information indicating a time when the owner data are generated, and the owner data, mapping the time information included in the received record to a physical address of a non-volatile memory, storing part or all of the record including the owner data to the mapped physical address of the non-volatile memory, receiving an access request including owner identifier information, user identifier information, tag information, a time period, and data processing information, generating output data by performing data processing corresponding to the data processing information with respect to owner data corresponding to the time period included in the received access request, and transmitting the output data based on the user identifier information.

According to an embodiment, a storage device may include a non-volatile memory that stores data, and a storage controller. The storage controller may receive a record including owner identifier information, tag information for classifying owner data, time information indicating a time when the owner data are generated, and the owner data, may map the time information included in the record to a physical address of the non-volatile memory, may store part or all of the record including the owner data to the mapped physical address of the non-volatile memory, may receive an access request including owner identifier information, user identifier information, tag information, a time period, and data processing information, may generate output data by performing data processing corresponding to the data processing information with respect to owner data corresponding to the time period included in the access request, and may transmit the output data based on the user identifier information.

According to an embodiment, a storage controller may include an external interface that communicates with the outside, a non-volatile memory interface that communicates with a non-volatile memory, and a processor. The processor may receive a record including owner identifier information, tag information for classifying owner data, time information indicating a time when the owner data are generated, and the owner data through the external interface, may map the time information included in the received record to a physical address of the non-volatile memory, may store part or all of the record including the owner data to the mapped physical address of the non-volatile memory through the non-volatile memory interface, may read owner data corresponding to an access request received through the external interface based on user identifier information, tag information, and a time period included in the access request, may generate output data by performing data processing corresponding to data processing information included in the access request with respect to the read owner data, and may transmit the output data to the outside through the external interface based on the user identifier information included in the access request.

BRIEF DESCRIPTION OF THE FIGURES

The above and other objects and features of the present disclosure will become apparent by describing in detail embodiments thereof with reference to the accompanying drawings.

FIG. 10 is a diagram illustrating a translation table including a mapping relationship of levels of a plurality of time information illustrated in FIG. 9 and physical addresses.

DETAILED DESCRIPTION

Below, embodiments of the present disclosure will be described in detail and clearly to such an extent that one of ordinary skill in the art may easily implement the invention. In the following description, specific details such as detailed components and structures are merely provided to assist the overall understanding of embodiments of the present disclosure. Therefore, it should be apparent to those skilled in the art that various changes and modifications of the embodiments described herein may be made without departing from the scope and spirit of the invention. In addition, the descriptions of well-known functions and structures are omitted for clarity and brevity. The terms described in the specification are terms defined in consideration of the functions in the present disclosure and are not limited to a specific function. The definitions of the terms should be determined based on the contents throughout the specification.

Components that are described in the detailed description with reference to the terms "circuit", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a micro electro mechanical system (MEMS), a passive element, or a combination thereof.

Figure 1:
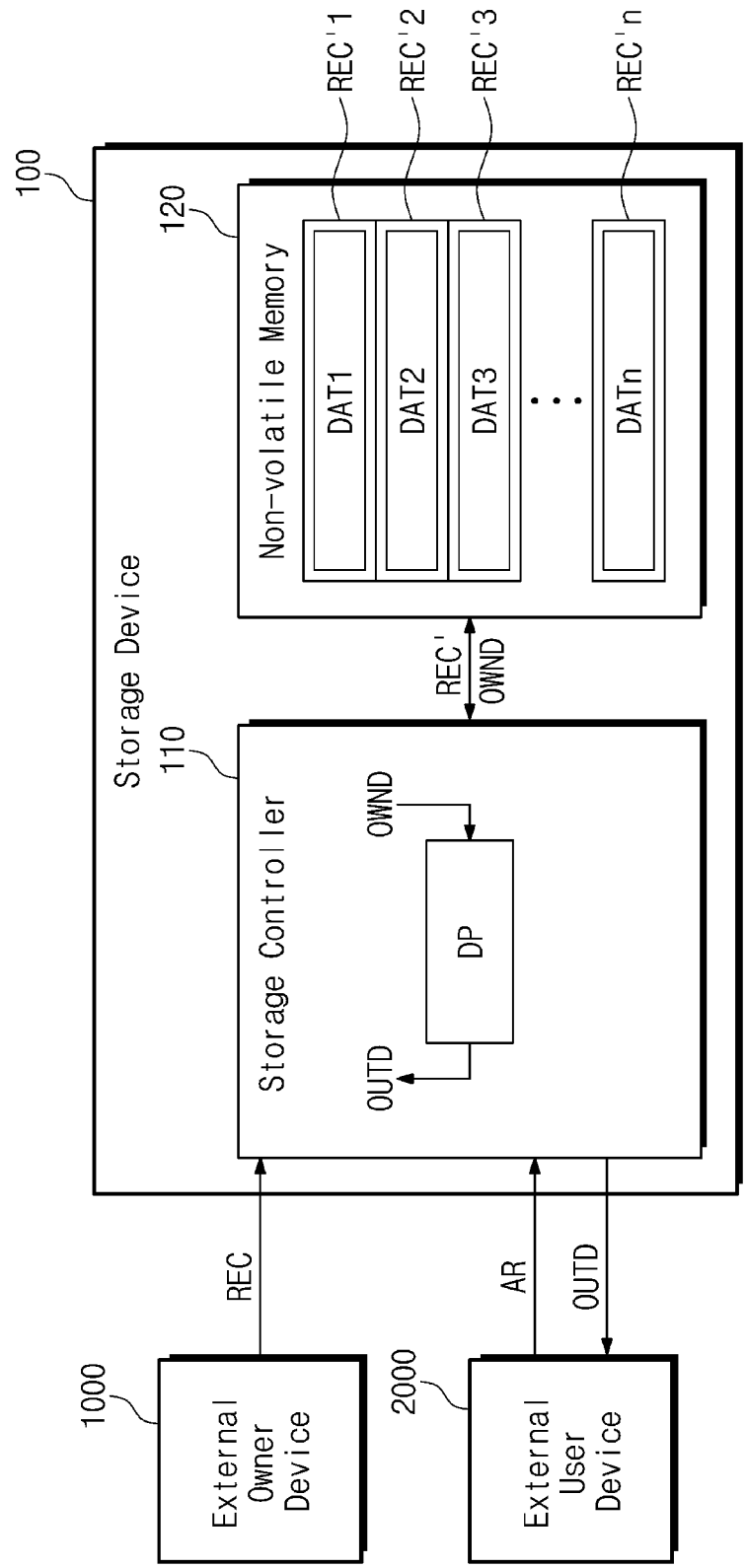
FIG. 1 is a block diagram illustrating a storage device according to an embodiment of the present disclosure.

FIG. 1 is a block diagram illustrating a storage device according to an embodiment of the present disclosure.

Referring to FIG. 1, a storage device 100 according to the present disclosure may include a storage controller 110 and a non-volatile memory 120. The storage controller 110 may communicate with the non-volatile memory 120 to transmit/receive data.

The storage controller 110 may receive a record REC from an external owner device 1000, and the record REC may include owner data and time information being a time when the owner data are generated. The storage controller 110 may allow the non-volatile memory 120 to store part or all REC' of the record REC including the owner data.

The storage controller 110 may receive an access request AR from an external user device 2000. The access request AR refers to a request for accessing the owner data included in the part or all REC' of the record REC stored in the non-volatile memory 120.

The access request AR may include a time period and data processing information. The time period included in the access request AR indicates a range of a time when data are generated. The data processing information included in the access request AR indicates data processing DP that the storage controller 110 will perform with respect to owner data corresponding to the time period.

The storage controller 110 may read the part or all REC' of the record REC stored in the non-volatile memory 120 in response to the access request AR thus received. That is, the storage controller 110 may access owner data OWND generated during the time period included in the access request AR.

The storage controller 110 may perform the data processing DP corresponding to the data processing information included in the access request AR with respect to the owner data OWND read from the non-volatile memory 120.

The data processing DP that the external user device 2000 requests refers to an operation that the storage controller 110 performs with respect to the read owner data OWND to generate output data OUTD. In this case, the data processing DP may refer to an operation that is performed to process the read owner data OWND in the format easy to utilize.

In an embodiment, the data processing DP may refer to various kinds of operations for calculating a statistical result such as average value calculation, sum calculation, counting of the number of times, maximum value calculation, and minimum value calculation for owner data. The data processing DP may also refer to various kinds of pre-processing operations for processing the owner data in the format appropriate for analysis or processing.

Through the data processing information included in the access request AR, the external user device 2000 may allow the storage device 100 to perform some or all of operations to be performed outside the storage device 100. This may make it possible to alleviate the burden on some or all of the operations to be performed outside the storage device 100.

The storage controller 110 may generate the output data OUTD as a result of performing the data processing DP with respect to the read owner data OWND. The output data OUTD may refer to data processed to be easy to utilize the owner data OWND on the user side. The storage controller 110 may transmit the output data OUTD to the external user device 2000.

The non-volatile memory 120 may operate under control of the storage controller 110 and may store part or all REC'1, ..., REC'n of a record including owner data DAT1, ..., DATn, which is received from the storage controller 110.

The non-volatile memory 120 may include a plurality of NAND flash memories. Alternatively, the non-volatile memory 120 may include an EEPROM (Electrically Erasable Programmable Read-Only Memory), a PRAM (Phase Change Random Access Memory), an RRAM (Resistance Random Access Memory), an NFGM (Nano Floating Gate Memory), a PoRAM (Polymer Random Access Memory), an MRAM (Magnetic Random Access Memory), an FRAM (Ferroelectric Random Access Memory), or any other memory similar thereto.

The external owner device 1000 may refer to an electronic device that generates owner data outside the storage device 100. The external owner device 1000 may generate owner data that are time-sequential. The external owner device 1000 may transmit the record REC including owner data and time information being a time when the owner data are generated, to the storage device 100.

The external user device 2000 may refer to an electronic device that accesses owner data outside the storage device 100. The external user device 2000 may transmit the access request AR including a time period to be accessed to the storage device 100. The external user device 2000 may receive the output data OUTD generated through the data processing DP, as a response to the access request AR transmitted.

The external owner device 1000 and the external user device 2000 may be connected with the storage device 100 over a wired/wireless network.

The storage device 100 may manage owner data received from the external owner device 1000 based on a generation time, which makes it easy to access and process the owner data OWND that are generated sequentially over time and are stored in the non-volatile memory 120.

Figure 2:
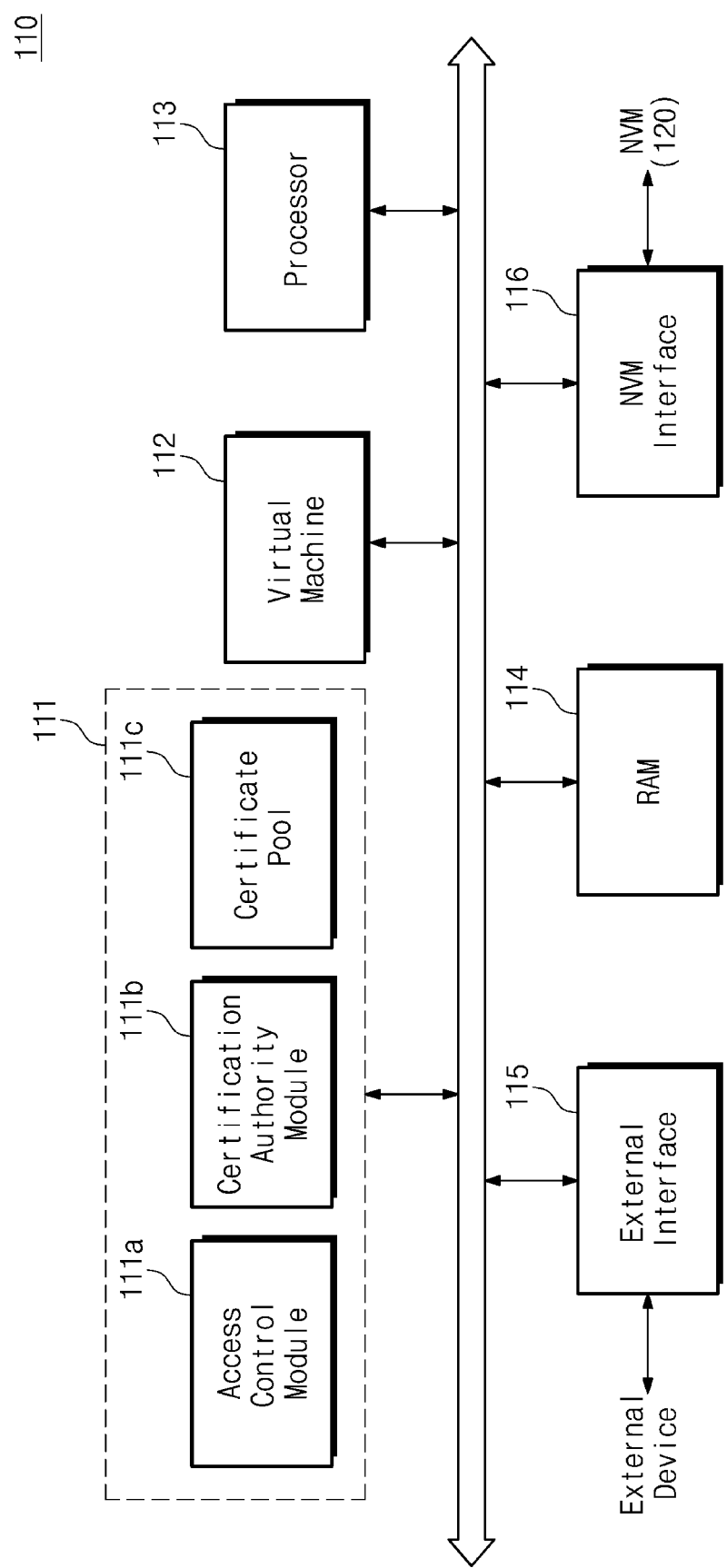
FIG. 2 is a block diagram illustrating a storage controller of FIG. 1.

FIG. 2 is a block diagram illustrating a storage controller of FIG. 1.

Referring to FIG. 2, the storage controller 110 of the storage device 100 may include a data manager 111, a virtual machine 112, a processor 113, a random access memory 114, an external interface 115, and a non-volatile memory interface 116. The data manager 111, the virtual machine 112, the processor 113, the random access memory 114, the external interface 115, and the non-volatile memory interface 116 may be interconnected through a bus.

The processor 113 may control an overall operation of the storage controller 110. For example, the processor 113 may execute various applications on the storage controller 110.

The random access memory 114 may be used as a working memory, a buffer memory, or a cache memory of the storage controller 110. For example, the random access memory 114 may be implemented with an SRAM (Static Random Access Memory), a DRAM (Dynamic Random Access Memory), etc.

The storage controller 110 may communicate with the outside of the storage device 100 through the external interface 115. The external interface 115 may include at least one of various interfaces such as a PCI-express (Peripheral Component Interconnect express) interface, an NVMe (non-volatile memory express) interface, a SATA (Serial ATA) interface, a SAS (Serial Attached SCSI) interface, and a UFS (Universal Flash Storage) interface. The external interface 115 may also include a network interface for communication with an external network of the storage device 100 in addition to a host interface.

The storage controller 110 may receive the record REC or the access request AR from the outside (e.g., an external owner device or an external user device) of the storage controller 110 through the external interface 115. Also, the storage controller 110 may transmit the output data OUTD to the outside of the storage device 100 through the external interface 115.

The storage controller 110 may communicate with the non-volatile memory 120 through the non-volatile memory interface 116. For example, the non-volatile memory interface 116 may be a NAND interface.

The data manager 111 may allow the non-volatile memory 120 to store the part or all REC' of the record REC including owner data, which is received through the external interface 115. Also, the data manager 111 may control an operation of reading the part or all REC' of one or more records REC present in the non-volatile memory 120 based on the received access request AR.

In this case, the data manager 111 may map time information included in the record REC to a physical address of the non-volatile memory 120 and may store the part or all REC' of the record REC including the owner data in the non-volatile memory 120. Also, the data manager 111 may read the part or all REC' of the record REC stored in the non-volatile memory 120 based on a mapping relationship between the time information and the physical address of the non-volatile memory 120, and the time period included in the access request AR. That is, the data manager 111 may access the owner data included in the part or all REC' of the record REC thus read.

Meanwhile, the data manager 111 may include an access control module 111a, a certification authority module 111b, and a certificate pool 111c. The access control module 111a included in the data manager 111 may process the record REC or the access request AR received through the external interface 115. The above operation in which the data manager 111 stores the part or all REC' of the record REC in the non-volatile memory 120 or the above operation in which the data manager 111 reads the part or all REC' of the record REC from the non-volatile memory 120 may be performed by the access control module 111a.

The access control module 111a may determine validity of the record REC based on the time information included in the record REC. The record REC that is generated on the outside of the storage device 100 may include owner data and time information being a time when the owner data are generated. In this case, the owner data included in the record REC may be generated sequentially over time. Accordingly, the access control module 111a may compare the time information of the record REC received from the outside with time information being the latest from among pieces of time information of part or all REC'1, ..., REC'n of a plurality of records REC that are previously received and are stored in the non-volatile memory 120.

When the time information of the record REC received from the outside is faster (e.g., earlier) than or equal to the time information being the latest from among the pieces of time information of the part or all REC'1, ..., REC'n of the plurality of records REC stored in the non-volatile memory 120, it may be impossible to guarantee that the owner data included in the record REC received from the outside are generated sequentially over time. In this case, the access control module 111a may determine that the record REC received from the outside is not valid. When it is determined that the record REC received from the outside is not valid, the access control module 111a may transmit a fail signal to the outside.

When the time information of the record REC received from the outside is later than the time information being the latest from among the pieces of time information of the part or all REC'1, ..., REC'n of the plurality of records REC stored in the non-volatile memory 120, the owner data included in the record REC received from the outside may be determined as being generated sequentially over time. In this case, the access control module 111a may determine that the record REC received from the outside is valid. When it is determined that the record REC received from the outside is valid, the access control module 111a may map the time information included in the record REC to the physical address of the non-volatile memory 120 and may allow the non-volatile memory 120 to store the part or all REC' of the record REC including the owner data.

Meanwhile, the access control module 111a may determine validity of the record REC received from the outside based on the time information of records corresponding to the same owner identifier information and the same tag information. That is, the access control module 111a may determine the validity of the record REC received from the outside based on the latest time information, which corresponds to the same owner identifier information and the same tag information as the record REC received from the outside, from among the time information of the part or all REC'1, ..., REC'n of the plurality of records present in the non-volatile memory 120.

When it is determined that the received record REC is valid, the access control module 111a may map the time information included in the record REC to the physical address of the non-volatile memory 120. The access control module 111a may control the non-volatile memory 120 such that the part or all REC' of the record REC including the owner data are written in a physical area corresponding to the physical address mapped to the time information.

The access control module 111a may determine the validity of the access request AR based on 1) a data processing list including pieces of data processing information corresponding to the data processing DP executable by the storage controller 110 and 2) data processing information included in the access request AR. That is, when the data processing information included in the access request AR is present in the data processing list, the storage controller 110 may perform the data processing DP corresponding to the data processing information. In this case, the access control module 111a may determine that the access request AR is valid.

Meanwhile, when the data processing information included in the access request AR is absent from the data processing list, the storage controller 110 may fail to perform the data processing DP corresponding to the data processing information. In this case, the access control module 111a may determine that the access request AR is not valid.

When it is determined that the access request AR is valid, the access control module 111a may allow the non-volatile memory 120 to read part or all of records present in the non-volatile memory 120, which correspond to the access request AR, from the physical area corresponding to the physical address mapped to the time information. That is, the access control module 111a may access the owner data OWND corresponding to the access request AR.

The certification authority module 111b may generate a signed certificate of an entity that is used to verify the record REC or the access request AR received from the outside. The certification authority module 111b may transmit the signed certificate of the entity to the outside of the storage device 100 through the external interface 115. The entity includes an owner or a user and is an individual accessing data stored in the storage device 100 from the outside of the storage device 100.

The certification authority module 111b may verify a signed certificate of an entity received from the outside of the storage device 100 or may a signed certificate of an entity stored in the certificate pool 111c. The certification authority module 111b may verify a signed certificate of an entity based on a public key of the storage device 100 included in a certificate of the storage device 100.

When the verification of the signed certificate of the entity succeeds, a public key of the entity included in the signed certificate of the entity may be used to verify a signature included in the record REC or the access request AR received from the outside. That is, a public key of an owner included in a signed certificate of the owner may be used to verify a signature of the owner included in the record REC and the access request AR. Also, a public key of a user included in a signed certificate of the user may be used to verify a signature of the user included in access request AR.

When the verification of the signed certificate of the entity fails, the public key of the entity included in the signed certificate of the entity may not be appropriate for verifying the signature included in the record REC or the access request AR. In this case, the certification authority module 111b may discard the signed certificate of the entity and may transmit the fail signal to the outside of the storage device 100 through the external interface 115.

When the verification of the signed certificate of the entity succeeds, the certification authority module 111b may verify the record REC received through the external interface 115. The certification authority module 111b may verify the record REC based on the public key of the owner included in the signed certificate of the owner and the signature of the owner included in the record REC.

The certification authority module 111b may verify the access request AR received through the external interface 115. The certification authority module 111b may verify the access request AR based on the public key of the owner included in the signed certificate of the owner, the public key of the user included in the signed certificate of the user, the signature of the owner included in the access request AR, and the signature of the user included in the access request AR.

Meanwhile, the certificate of the storage device 100 that is used to verify the signed certificate of the entity may be stored in the non-volatile memory 120. The certificate of the storage device 100 may include various kinds of information about the storage device 100 and the public key of the storage device 100.

The certificate pool 111c may store the signed certificate of the entity. The signed certificate of the entity stored in the certificate pool 111c may be generated by the certification authority module 111b. Also, the signed certificate of the entity stored in the certificate pool 111c may be received from the outside.

The signed certificate of the entity may include various kinds of information about the entity, the public key of the entity, and the signature of the storage device 100. That is, the certificate of the owner may include various kinds of information about the owner, the public key of the owner, and the signature of the storage device 100, and the certificate of the user may include various kinds of information about the user, the public key of the user, and the signature of the storage device 100. The signature of the storage device 100 included in the signed certificate of the entity is in a state of being encrypted by using a private key of the storage device 100.

The certification authority module 111b may verify the certificate of the entity through the certificate of the storage device 100. In detail, the certification authority module 111b may verify the certificate of the entity through the public key included in the certificate of the storage device 100.

The certification authority module 111b may verify the record REC or the access request AR received from the outside based on the public key of the entity included in the signed certificate of the entity thus verified. In response to the record REC or the access request AR verified by the certification authority module 111b, the access control module 111a may write part or all of the record REC including owner data in the non-volatile memory 120 or may read the owner data OWND from the non-volatile memory 120.

The virtual machine 112 is an isolated environment implemented in the storage controller 110. The virtual machine 112 may execute an operating system and an application independent from the storage controller 110. The virtual machine 112 may perform data processing based on the data processing information included in the access request AR.

The data manager 111 and the virtual machine 112 may be implemented with hardware, software or a combination of hardware and software. For example, at least part of the data manager 111 and the virtual machine 112 may be included in the storage controller 110 in the form of a separate circuit device or chip. At least part of the data manager 111 or the virtual machine 112 may be implemented by a software module that is loaded to the random access memory 114 by the processor 113. An embodiment in which the data manager 111 and the virtual machine 112 are independent components is illustrated in FIG. 2, but the present disclosure is not limited thereto. For example, part or all of the data manager 111 and the virtual machine 112 may be included in one or more of any other components.

Figure 3:
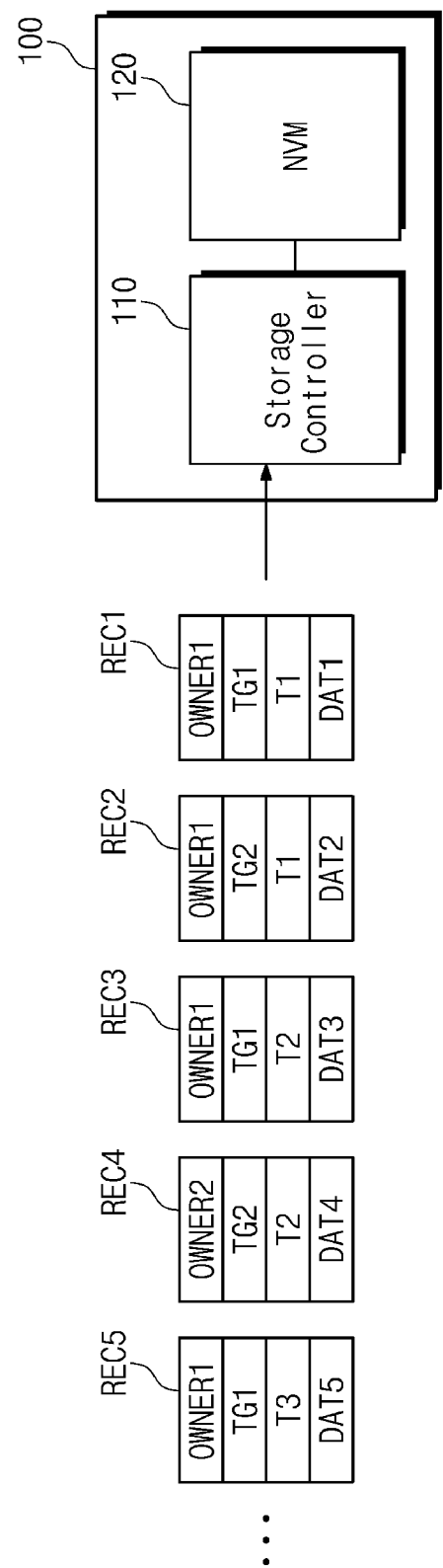
FIG. 3 is a diagram illustrating an operation in which a storage device receives a plurality of records, according to an embodiment of the present disclosure.

FIG. 3 is a diagram illustrating an operation in which a storage device receives a plurality of records, according to an embodiment of the present disclosure.

Referring to FIG. 3, the storage controller 110 of the storage device 100 may receive records REC1, REC2, etc. generated on the outside.

The records REC1, REC2, REC3, REC4, REC5, ... etc. generated on the outside of the storage device 100 may include owner identifier information OWNER1 and OWNER2, owner data DAT1, DAT2, DAT3, DAT4, DAT5, ... etc., tag information TG1, TG2, etc. for classifying owner data, and time information T1, T2, T3, etc. being a time when owner data are generated.

Meanwhile, the record may further include an extra field. The extra field is associated with information corresponding to additional content in addition to the owner identifier information, the time information, and the tag information. For example, extra field may include data type information, data size information, and data relationship information. The data type information indicates the type of owner data. For example, the owner data may be one of a plurality of types, such as audio type, video type, image type, text type, etc. The data size information may indicate the size of the owner data. The data relationship information indicates the connection between neighboring records. For example, based on time information, the earlier owner data and later owner data of neighboring records may be connected data. The Earlier owner data and the later owner data may also be disconnected data. The data relationship information may indicate the connection or disconnection of owner data for neighboring records.

As described above, the owner data are data that are generated by an external owner device placed outside the storage device 100 with regard to a specific owner. The owner identifier information is a unique identifier of an entity that intends to store owner data in the storage device 100 through a record including the owner data.

According to the example illustrated in FIG. 3, the record REC1 includes the owner identifier information OWNER1, the tag information TG1, the time information T1, and the owner data DAT1. The record REC2 includes the owner identifier information OWNER1, the tag information TG2, the time information T1, and the owner data DAT2. The record REC3 includes the owner identifier information OWNER1, the tag information TG1, the time information T2, and the owner data DAT3. The record REC4 includes the owner identifier information OWNER2, the tag information TG2, the time information T2, and the owner data DAT4. The record REC5 includes the owner identifier information OWNER1, the tag information TG1, the time information T3, and the owner data DAT5.

The storage controller 110 may classify and manage owner data based on owner identifier information included in a record. The records REC1, REC2, REC3, and REC5 that include the owner identifier information OWNER1 are records associated with the same owner. The record REC4 that includes the owner identifier information OWNER2 is a record associated with an owner different from the owner of the records REC1, REC2, REC3, and REC5.

The storage controller 110 may classify and manage owner data based on tag information included in a record. The records REC1 and REC2 among the records REC1, REC2, REC3, and REC5 including the owner identifier information OWNER1 are records associated with the same owner; however, the record REC1 includes the tag information TG1, and the record REC2 includes the tag information TG2. That is, even though the record REC1 and the record REC2 are records associated with the same owner, the storage controller 110 may classify and manage the record REC1 and the record REC2.

The storage controller 110 may manage owner data based on time information included in a record. The records REC1 and REC3 among the records REC1, REC2, REC3, and REC5 include the same owner identifier information OWNER1 and the same tag information TG1. In this case, the record REC1 includes the time information T1, and the record REC3 includes the time information T2. That is, owner data included in the record REC1 and owner data included in the record REC3 may be determined based on time information as being generated at different times, and thus, the storage controller 110 may classify and manage the record REC1 and the record REC3.

The storage controller 110 may write the owner data DAT1, DAT2, DAT3, DAT4, and DAT5 included in the received records REC1, REC2, REC3, REC4, and REC5 in the non-volatile memory 120. In this case, the storage controller 110 may write part or all of each of the records REC1, REC2, REC3, REC4, and REC5 including the owner data DAT1, DAT2, DAT3, DAT4, and DAT5 in the non-volatile memory 120.

Figure 4:
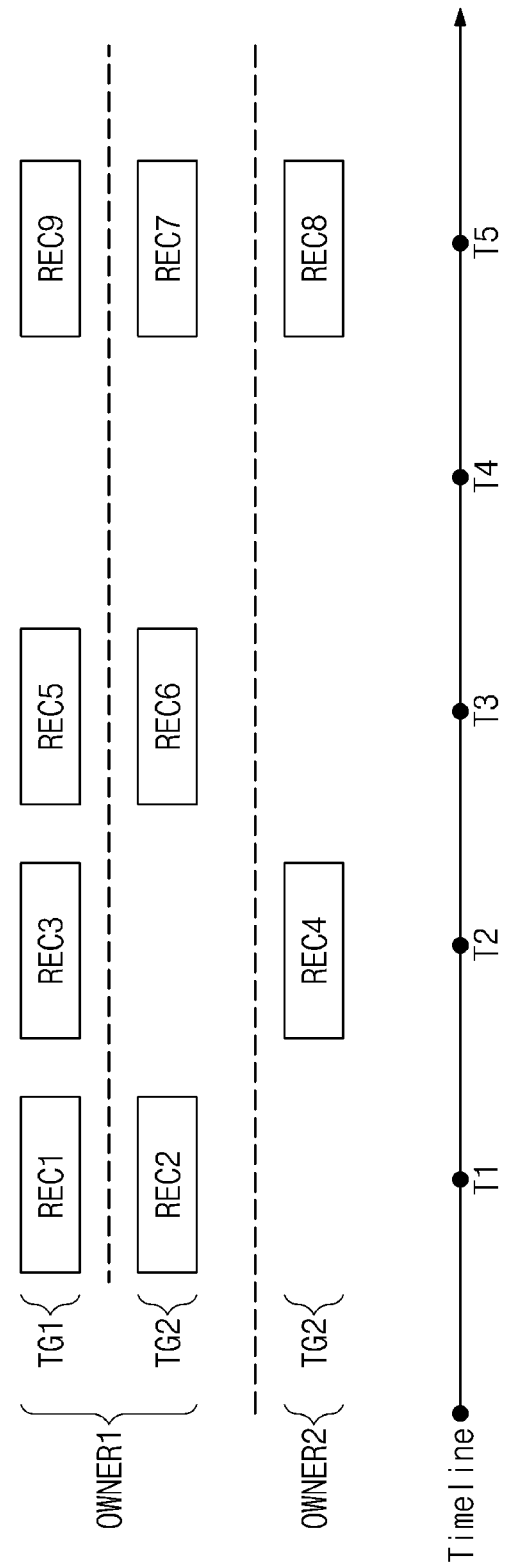
FIG. 4 is a diagram illustrating records associated with owner identifier information, tag information, and time information that a storage device receives, according to an embodiment of the present disclosure.

FIG. 4 is a diagram illustrating records associated with owner identifier information, tag information, and time information that a storage device receives, according to an embodiment of the present disclosure.

Referring to FIG. 4, the storage controller 110 may manage records REC1, REC2, etc. including owner data based on owner identifier information, tag information, and time information.

When owner identifier information of records including the same tag information and the same time information are different, the storage controller 110 may classify and manage the records based on the owner identifier information.

Meanwhile, when tag information of records including the same owner identifier information and the same time information are different, the storage controller 110 may classify and manage the owner data and the record based on the tag information.

Meanwhile, when time information of records including the same owner identifier information and the same tag information are different, the storage controller 110 may classify and manage the owner data included in the records based on the time information. In this case, the storage controller 110 may manage time information included in a record in a time-sequential manner.

It is assumed that the storage controller 110 receives a plurality of records REC1, REC2, . . . , REC9.

The storage controller may classify and manage the records REC1, REC2, REC3, REC5, REC6, REC7, and REC9 corresponding to the owner identifier information OWNER1 and the records REC4 and REC8 corresponding to the owner identifier information OWNER2. The owner identifier information OWNER1 and the owner identifier information OWNER2 indicate different owners.

With regard to the records REC1, REC2, REC3, REC5, REC6, REC7, and REC9 corresponding to the owner identifier information OWNER1, the storage controller may classify and manage the records REC1, REC3, REC5, and REC9 corresponding to the tag information TG1 and the records REC2, REC6, and REC7 corresponding to the tag information TG2.

The tag information TG1 and the tag information TG2 are used to classify different kinds of data. In an embodiment, owner data corresponding to the tag information TG1 may be data on an image or a video generated by an imaging device, and owner data corresponding to the tag information TG2 may be data on coordinates generated by a position tracking device. In other words, the tag information is information for classifying (or distinguishing) different kinds of owner data.

The storage controller 110 may mange the record REC1 to the record REC9 in a time-sequential manner. The owner data REC1, REC3, REC5, and REC9 included in the records corresponding to the owner identifier information OWNER1 and the tag information TG1 are data of the same owner and the same kind. In this case, the storage controller 110 may check that the record REC1 is generated at time T1 on the outside of the storage controller 110, based on the time information T1 included in the record REC1. The storage controller 110 may check that the record REC3 is generated at time T2 on the outside of the storage controller 110, based on the time information T2 included in the record REC3. The storage controller 110 may classify the owner data of the record REC1 and the owner data of the record REC3 through the time information T1 included in the record REC1 and the time information T3 included in the record REC3.

For example, the record REC1 and the record REC2 include owner data that are data associated with the same owner and are generated at the same point in time on the outside of the storage device 100 but respectively include different tag information, that is, the tag information TG1 and the tag information TG2. The storage controller 110 may classify the record REC1 and the record REC2 based on tag information.

The record REC1 and the record REC3 include owner data that are associated with the same owner and correspond to the same kind but include different time information, that is, the time information T1 and the time information T2. The storage controller 110 may classify the record REC1 and the record REC3 based on time information.

That is, the record REC7 and the record REC8 include owner data that are data associated with the same tag information and are generated at the same point in time on the outside of the storage device 100 but include different owner identifier information, that is, the owner identifier information OWNER1 and the owner identifier information OWNER2. The storage controller 110 may classify the record REC7 and the record REC8 based on owner identifier information.

Figure 5:
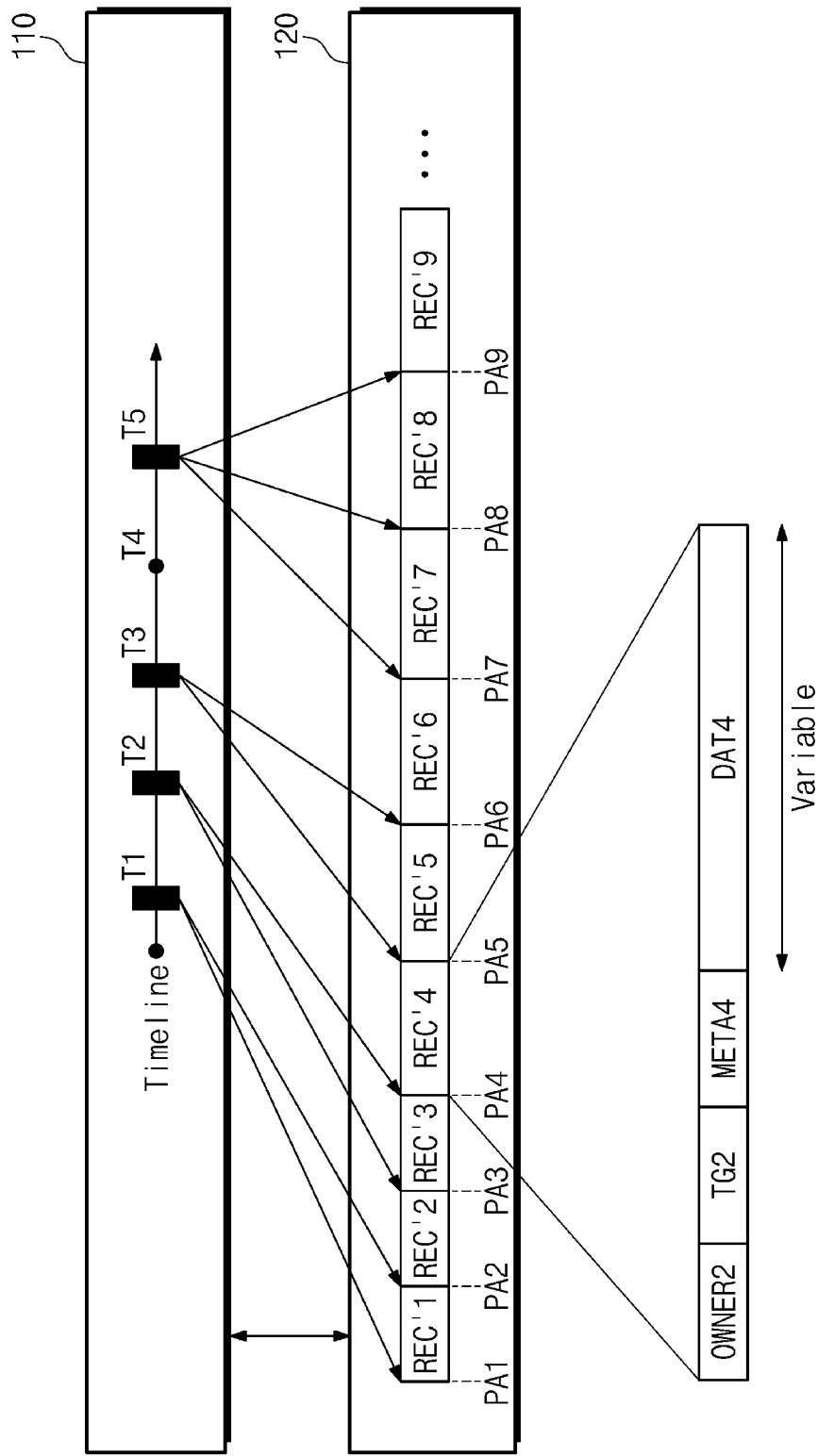
FIG. 5 is a diagram illustrating a relationship between time information and a physical address of a non-volatile memory, according to an embodiment of the present disclosure.

FIG. 5 is a diagram illustrating a relationship between time information and a physical address of a non-volatile memory, according to an embodiment of the present disclosure.

Figure 6:
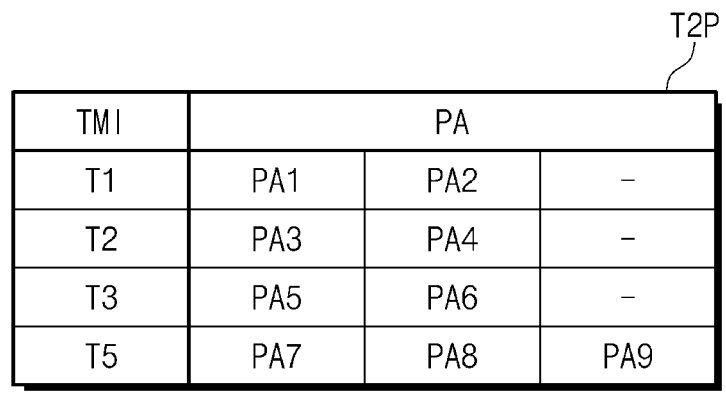
FIG. 6 is a diagram illustrating a translation table including a mapping relationship of time information and a physical address illustrated in FIG. 5.

FIG. 6 is a diagram illustrating a translation table including a mapping relationship of time information and a physical address illustrated in FIG. 5.

Referring to FIGS. 5 and 6, the storage controller 110 may update a translation table T2P such that time information and a physical address of the non-volatile memory 120 are mapped. The storage controller 110 may write part or all REC'1, REC'2, etc. of records including owner data in a physical area corresponding to a physical address PA of the non-volatile memory 120, based on the translation table T2P. Owner identifier information, tag information, metadata, and owner data may be written in the physical area corresponding to the physical address PA mapped to time information TMI, based on the translation table T2P. The metadata may be various kinds of data that are used to manage owner data.

Each of the record REC1 to the record REC9 that the storage controller 110 receives may include owner identifier information, tag information, the time information TMI, and owner data. The record REC1 and the record REC2 include the time information T1. The record REC3 and the record REC4 include the time information T2. The record REC5 and the record REC6 include the time information T3. The record REC7, the record REC8, and the record REC9 include the time information T5. Meanwhile, there is no record REC corresponding to time T4.

The storage controller 110 may map a physical address of the non-volatile memory 120 to a time on a timeline. The storage controller 110 may update the translation table T2P such that a physical address PA1 and a physical address PA2 are mapped to time T1. The storage controller 110 may write part or all REC'1 of the record REC1 in a physical area corresponding to the physical address PA1 so as to include the owner data corresponding to the record REC1. The storage controller 110 may write part or all REC'2 of the record REC2 in a physical area corresponding to the physical address PA2.

As an example, the storage controller 110 may receive the record REC4 from the outside. The storage controller 110 may update the translation table T2P based on the time information T2 included in the record REC4 such that time T2 and a physical address PA4 are mapped. The storage controller 110 may write part or all REC'4 of the record REC4 in a physical area corresponding to the physical address PA4 of the non-volatile memory 120 so as to include the owner data DAT4 at corresponding to the record REC4.

That is, the non-volatile memory 120 may store the owner identifier information OWNER2, the tag information TG2, metadata META4, and the owner data DAT4 in the physical area corresponding to the physical address PA4. The metadata META4 that are data associated with the owner data DAT4 are various kinds of data that are used to manage the owner data DAT4. Meanwhile, the size of owner data included in a record may be variable.

The storage controller 110 may check the physical address PA mapped to the time information TMI with reference to the translation table T2P.

As an example, the owner data corresponding to time T1 may be stored in the physical areas corresponding to the physical address PA1 and the physical address PA2 of the non-volatile memory 120. In other words, because one or more owner data correspond to one time, one or more physical addresses PA may be mapped on the translation table T2P for each time.

Meanwhile, an interval between adjacent physical addresses among the physical addresses PA1, PA2, . . . , PA9 may be determined depending on the size of owner data being variable.

The storage controller 110 may directly access the non-volatile memory 120 based on time information, by mapping and managing time information and a physical address. That is, the storage device 100 may manage owner data based on time information regardless of the outside of the storage device 100 such as a host.

Figure 7:
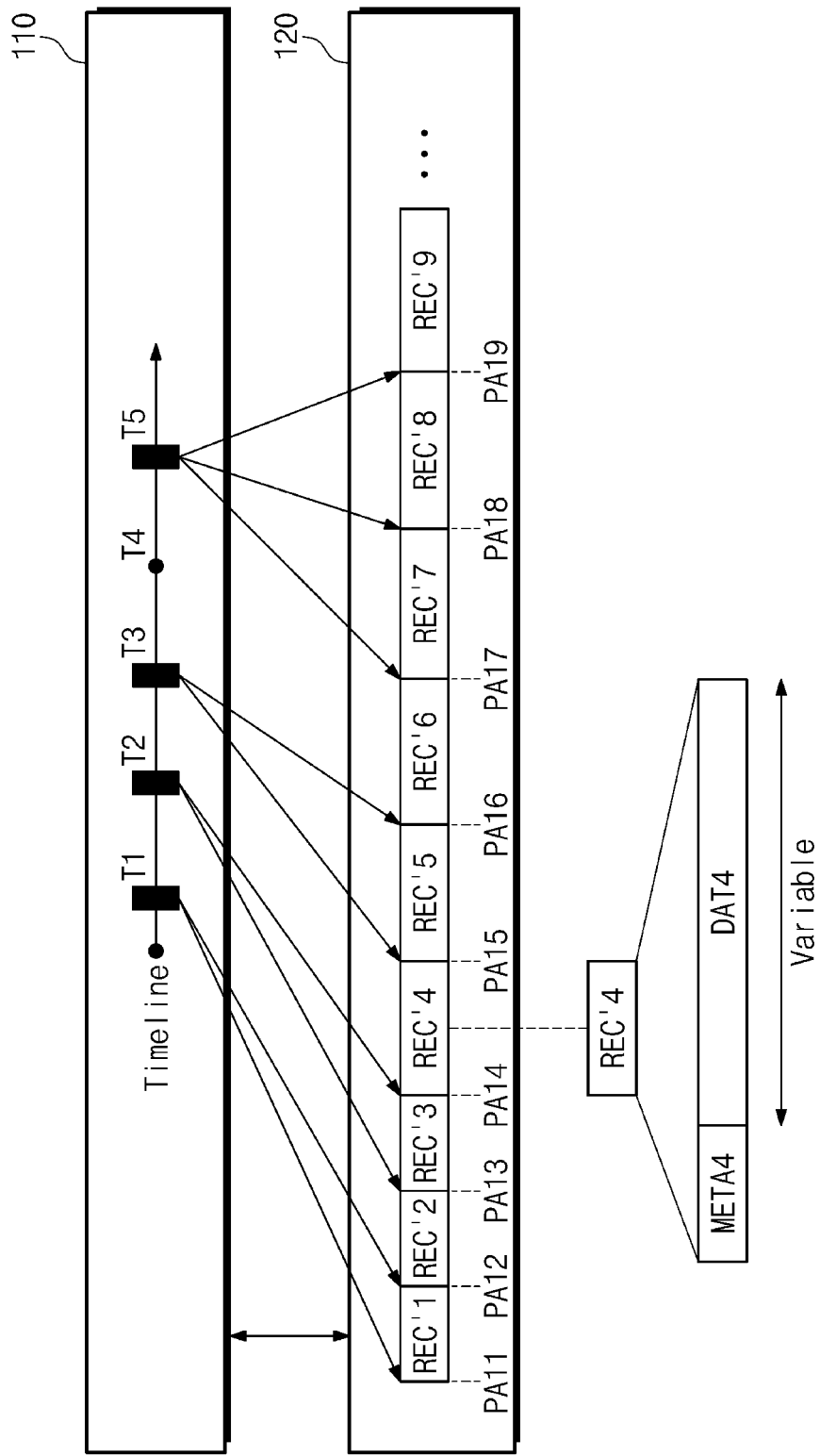
FIG. 7 is a diagram illustrating another example of a relationship between time information and a physical address of a non-volatile memory, according to an embodiment of the present disclosure.

FIG. 7 is a diagram illustrating another example of a relationship between time information and a physical address of a non-volatile memory, according to an embodiment of the present disclosure.

Figure 8:
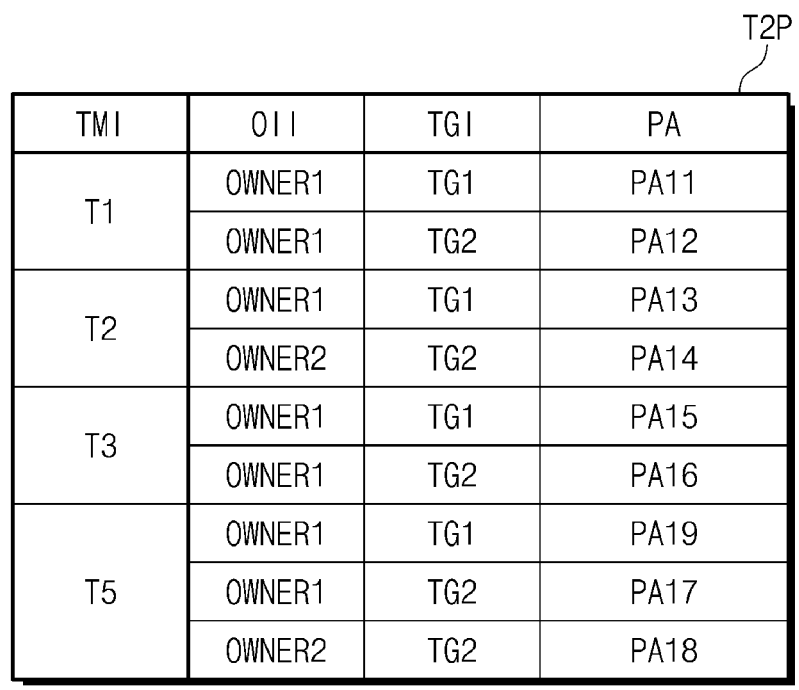
FIG. 8 is a diagram illustrating a translation table including a mapping relationship between time information, owner identifier information, and tag information and a physical address illustrated in FIG. 7.

FIG. 8 is a diagram illustrating a translation table including a mapping relationship between time information, owner identifier information, and tag information and a physical address illustrated in FIG. 7.

Referring to FIGS. 7 and 8, the translation table T2P may further include owner identifier information OII and tag information TGI.

When the storage controller 110 receives a record, the storage controller 110 may check the time information TMI, the owner identifier information OII, and the tag information TGI. The storage controller 110 may update the translation table T2P mapping the physical address PA of non-volatile memory to combination of the time information TMI, the owner identifier information OII, and the tag information TAG. The storage controller 110 may write part or all of the record including owner data in a physical area corresponding to the physical address PA. That is, based on the translation table T2P, the storage controller 110 may write metadata and owner data in a physical area corresponding to the physical address PA mapped to the time information TMI, the owner identifier information OII, and the tag information TGI.

Each of the record REC1 to the record REC9 that the storage controller 110 receives may include one of the owner identifier information OWNER1 and OWNER2, one of the tag information TG1 and TG2, and one of the time information T1, T2, T3, and T5. The record REC1 and the record REC2 include the time information T1. The record REC3 and the record REC4 include the time information T2. The record REC5 and the record REC6 include the time information T3. The record REC7, the record REC8, and the record REC9 include the time information T5.

The records REC1, REC2, REC3, REC5, REC6, REC7, and REC9 that the storage controller 110 receives include the owner identifier information OWNER1. The records REC4 and REC8 include the owner identifier information OWNER2.

The records REC1, REC3, REC5, and REC9 that the storage controller 110 receives include the tag information TG1. The records REC2, REC4, REC6, REC7, and REC8 include the tag information TG2.

When the storage controller 110 receives the record REC4, the storage controller 110 may update the translation table T2P such that a physical address PA14 is mapped to time T2, the owner identifier information OWNER2, and the tag information TG2. The storage controller 110 may write the metadata META4 and the owner data DAT4 in the physical area corresponding to the physical address PA14 of the non-volatile memory 120.

Owner data included in a record are unique for each combination of the owner identifier information OII, the tag information TGI, and the time information TMI. Accordingly, one physical address may be mapped to one combination of owner identifier information, tag information, and time information on the translation table T2P.

As described with reference to FIGS. 5 and 6, when time information and a physical address are mapped, the storage controller 110 writes owner identifier information, tag information, metadata, and owner data in a physical area corresponding to the physical address. Accordingly, the translation table T2P may be implemented with a relatively small size.

As described with reference to FIGS. 7 and 8, when the storage controller 110 maps a physical address to combination of time information, owner identifier information, and tag information, the storage controller 110 writes metadata and owner data in a physical area corresponding to the physical address. The storage controller 110 may specify the time information TMI, the owner identifier information OII, and the tag information TGI through the translation table T2P and may access the physical address. That is, the storage controller 110 may directly access owner data without searching for the owner data corresponding to owner identifier information and tag information from among the owner data stored in the non-volatile memory 120. Accordingly, operations of reading records and operations of checking information in operations of searching can be omitted.

Figure 9:
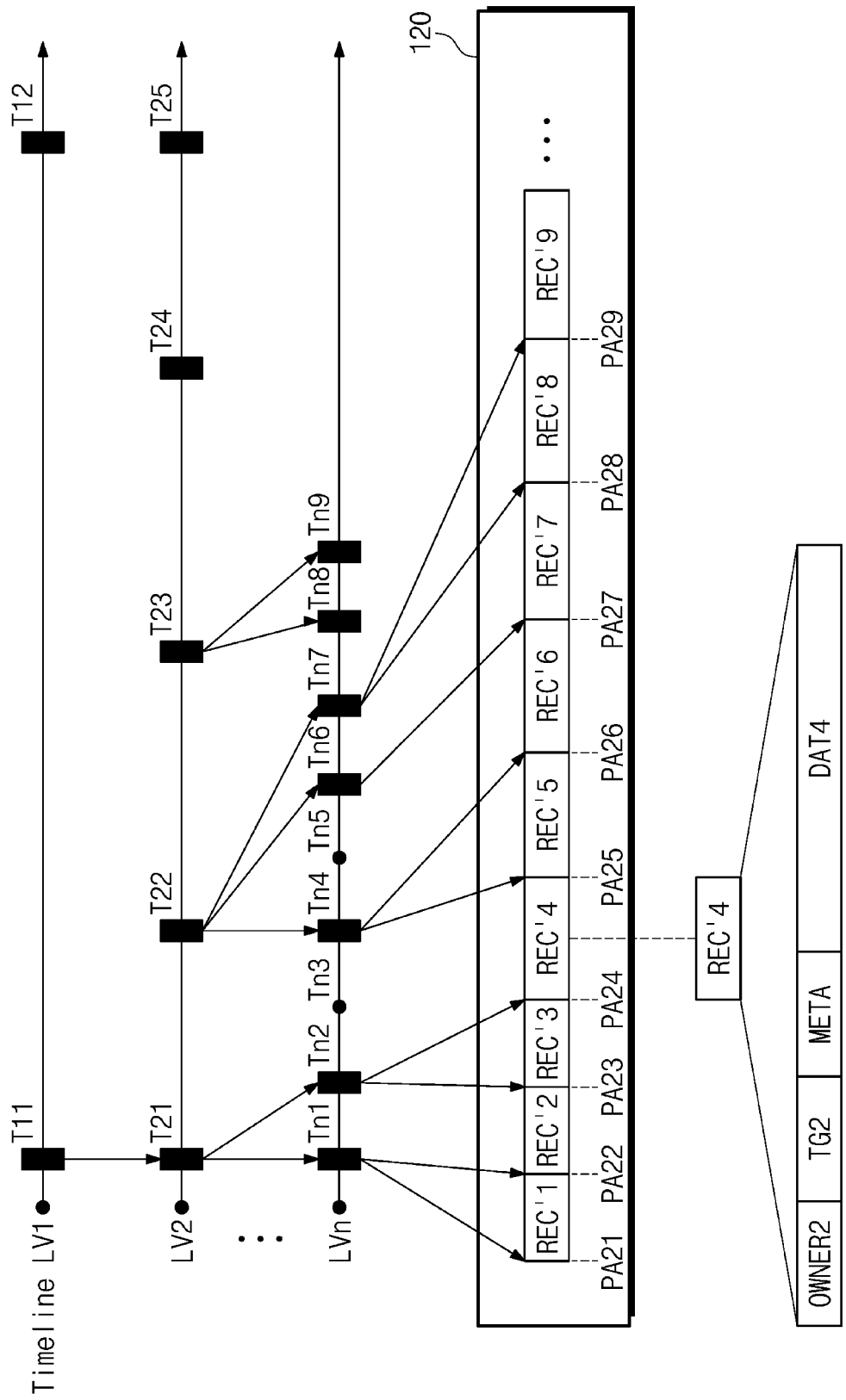
FIG. 9 is a diagram illustrating levels of a plurality of time information according to an embodiment of the present disclosure.

FIG. 9 is a diagram illustrating levels of a plurality of time information according to an embodiment of the present disclosure.

FIG. 10 is a diagram illustrating a translation table including a mapping relationship of levels of a plurality of time information illustrated in FIG. 9 and physical addresses.

Referring to FIGS. 9 and 10, the translation table T2P may include levels of a plurality of time information.

In the levels of the plurality of time information, a relatively higher level may correspond to a greater time unit than a relatively lower level.

Assuming that the translation table T2P include "n" time information levels LV1, LV2, . . . , LVn, the first level LV1 corresponding to the highest level from among the "n" time information levels LV1, LV2, . . . , LVn may correspond to the greatest time unit. The second level LV2 may correspond to a smaller time unit than the first level LV1. The n-th level LVn corresponding to the lowest level from among the "n" time information levels LV1, LV2, . . . , LVn may correspond to the smallest time unit.

When the first level LV1 corresponds to a "Year" unit, the second level LV2 may correspond to a time unit smaller than the "Year" unit, for example, a "Month" unit or a "Day" unit.

When the first level LV1 corresponds to the "Year" unit, time T11 may correspond to a specific year, and time T12 may correspond to a next year of time T11. Time T21, time T22, time T23, and time T24 of the second level LV2 being a lower level may be mapped to time T11.

On the translation table T2P, one or more physical addresses of the non-volatile memory 120 may be mapped to a time of the n-th level LVn being the lowest level.

A physical address PA21 and a physical address PA22 may be mapped to time Tn1, and a physical address PA23 and a physical address PA24 may be mapped to time Tn2.

The storage controller 110 may map corresponding physical addresses to a plurality of time units through the translation table T2P including levels of a plurality of time information. As an example, time T21 may correspond to the second level LV2, and the plurality of physical addresses PA21, PA22, PA23, and PA24 may be mapped to time T21. That is, when the access to owner data is made from the outside of the storage device 100 through an access request, a mapping relationship of time information and physical addresses corresponding to a plurality of time units may be provided. A time period included in an access request may be a unit corresponding to one of the first level LV1 to the n-th level LVn.

Figure 11:
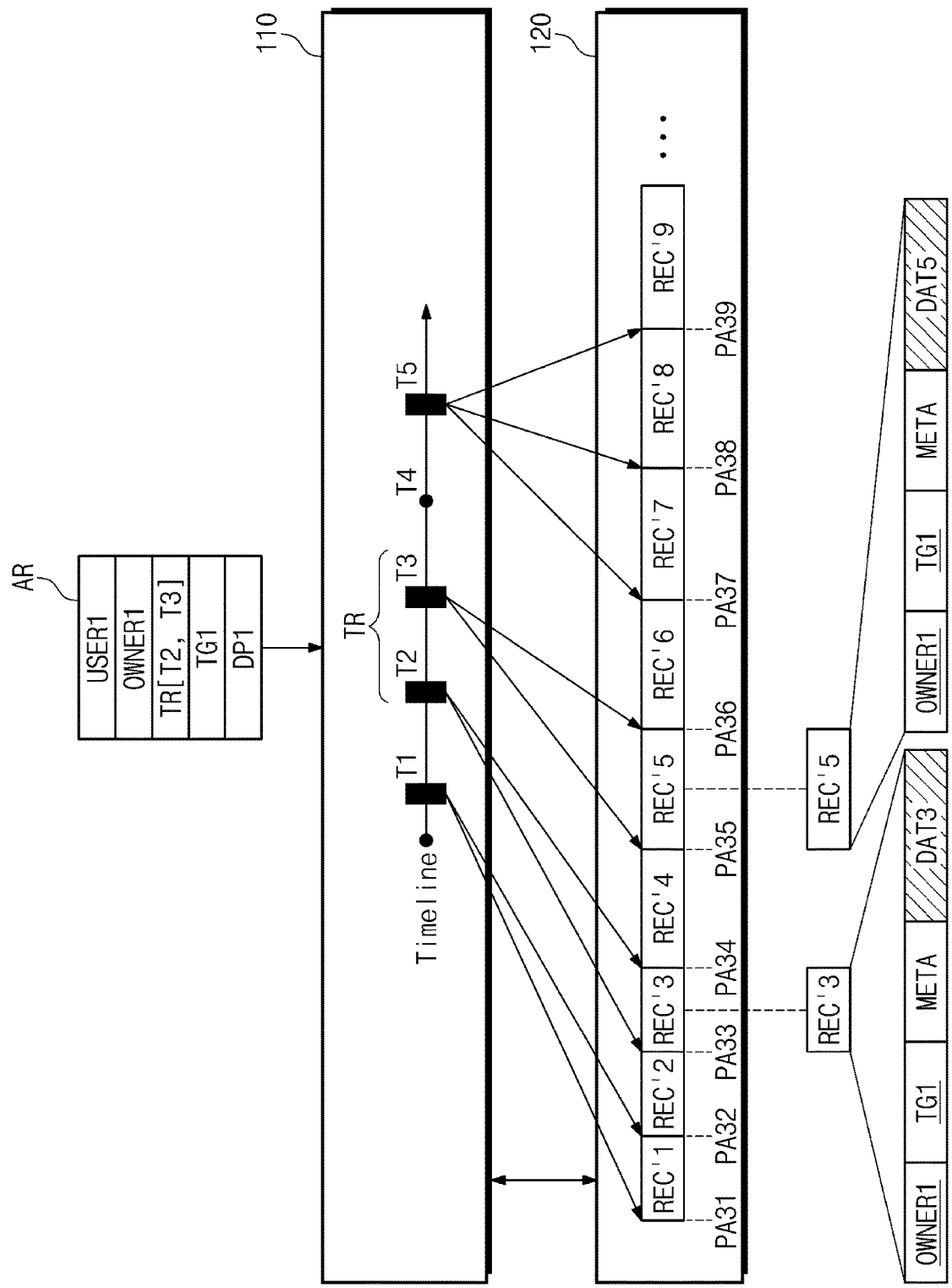
FIG. 11 is a diagram illustrating an operation in which a storage device searches for owner data, according to an embodiment of the present disclosure.

FIG. 11 is a diagram illustrating an operation in which a storage device searches for owner data, according to an embodiment of the present disclosure.

Referring to FIG. 11, the storage controller 110 may receive the access request AR from the outside of the storage device 100. The access request AR may include user identifier information, owner identifier information, a time period, tag information, and data processing information.

The storage controller 110 may search for owner data, in which the owner identifier information and the tag information included in the access request AR are matched, from among owner data belonging to the time period included in the access request AR.

It is assumed that a translation table implemented by the storage controller 110 indicates a relationship in which a physical address PA31 and a physical address PA32 are mapped to time T1, a physical address PA33 and a physical address PA34 are mapped to time T2, a physical address PA35 and a physical address PA36 are mapped to time T3, and a physical address PA37, a physical address PA38, and a physical address PA39 are mapped to time T5.

Because the access request AR received by the storage controller 110 includes a time period TR [T2, T3], the storage controller 110 may access physical areas corresponding to the physical address PA33, the physical address PA34, the physical address PA35, and the physical address PA36 of the non-volatile memory 120 corresponding to time T2 and time T3 on the translation table.

The storage controller 110 may read part or all REC'3, REC'4, REC'5, and REC'6 of records stored in the physical areas corresponding to the physical address PA33, the physical address PA34, the physical address PA35, and the physical address PA36, respectively.

The storage controller 110 may compare the owner identifier information OWNER1 and the tag information TG1 included in the received access request AR with those of the part or all REC'3, REC'4, REC'5, and REC'6 of the records thus read.

The storage controller 110 may check the owner data DAT3 and the owner data DAT5 corresponding to the owner identifier information OWNER1 and the tag information TG1.

Afterwards, the storage controller 110 may perform data processing corresponding to the data processing information included in the received access request AR with respect to the owner data DAT3 and the owner data DAT5. The storage controller 110 may transmit output data generated through the data processing to the outside of the storage controller 110 based on user identifier information USER1 included in the access request AR.

Figure 12:
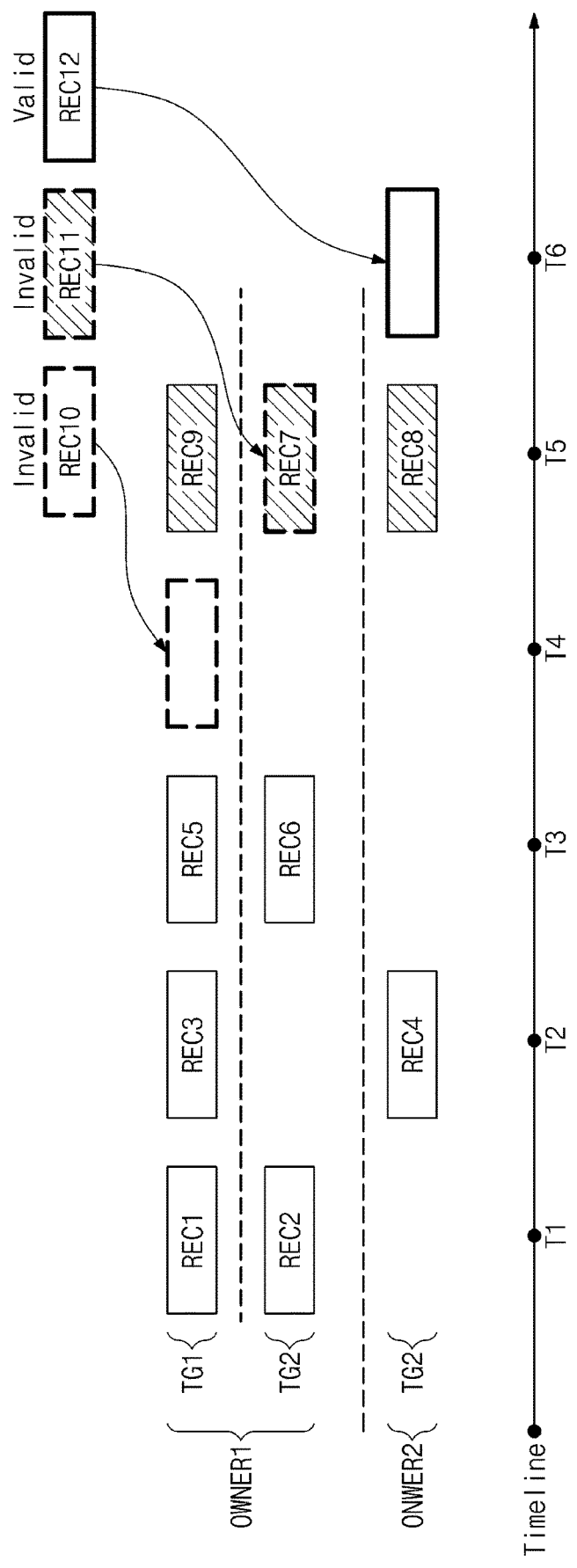
FIG. 12 is a diagram illustrating an operation of determining validity of a record based on time information included in the record, according to an embodiment of the present disclosure.

FIG. 12 is a diagram illustrating an operation of determining validity of a record based on time information included in the record, according to an embodiment of the present disclosure.

Referring to FIG. 12, the storage controller 110 may determine the validity of the received record by comparing the time information of the received record with time information of the latest record, in which owner identifier information and tag information are matched with those of the received record, from among one or more records, part or all of which are stored in the non-volatile memory 120.

Basically, records REC10, REC11, and REC12 received from a reliable external owner device may be written in the non-volatile memory 120. The records REC10, REC11, and REC12 may be written based on time information which indicates (e.g., represents) generation times of owner data included in the records REC10, REC11, and REC12. Additionally, when there is a need to store owner data (or records) in one direction based on a generation time, the validity of the received record may be determined as illustrated in FIG. 12.

When the storage controller 110 receives records corresponding to the same owner identifier information and the same tag information, the storage controller 110 may determine whether time information included in the records is generated sequentially over time and may determine validity of the received records. In other words, when there is a record whose time information is faster (e.g., earlier) than or equal to time information of the records including the same owner identifier information and the same tag information, the record may be determined as an invalid record.

It is assumed that the storage controller 110 stores part or all of previously received records REC1, REC2, . . . , REC9 in the non-volatile memory 120.

Afterwards, the storage controller 110 may receive the record REC10, the record REC11, and the record REC12. The record REC10 includes the owner identifier information OWNER1, the tag information TG1, and the time information T4. The record REC11 includes the owner identifier information OWNER1, the tag information TG2, and the time information T5. The record REC12 includes the owner identifier information OWNER2, the tag information TG2, and the time information T6.

When the storage controller 110 receives the record REC10, the storage controller 110 may compare the time information T4 of the record REC10 with the time information T5 of the record REC9 being the latest from among the records REC1, REC3, REC5, and REC9 in which the owner identifier information OWNER1 and the tag information TG1 are matched with those of the record REC10.

The time information T4 included in the record REC10 is earlier than the time information T5 included in the record REC9. Given that the time information T4 is earlier than the time information T5, the storage controller 110 may determine that the time information of the record REC10 is reversed. Accordingly, the storage controller 110 may determine that the record REC10 is an invalid record.

When the storage controller 110 receives the record REC11, the storage controller 110 may compare the time information T5 of the record REC11 with the time information T5 of the record REC7 being the latest from among the records REC2, REC6, and REC7 in which the owner identifier information OWNER1 and the tag information TG2 are matched with those of the record REC11.

The time information T5 included in the record REC11 is equal to the time information T5 included in the record REC7. Given that the REC11 and the REC7 have the same time information T5, the storage controller 110 may determine that the time information of the record REC11 is duplicated. Accordingly, the storage controller 110 may determine that the record REC11 is an invalid record.

When the storage controller 110 receives the record REC12, the storage controller 110 may compare the time information T6 of the record REC12 with the time information T5 of the record REC8 being the latest from among the records REC4 and REC8 in which the owner identifier information OWNER2 and the tag information TG2 are matched with those of the record REC12.

The time information T6 included in the record REC12 is later than the time information T5 included in the record REC8. Given that the time information T6 is later than the time information T5, the storage controller 110 may determine that the record REC12 is a record generated over time. Accordingly, the storage controller 110 may determine that the record REC12 is a valid record.

With regard to the record REC10 and the record REC11, the storage controller 110 may transmit the fail signal to the outside of the storage device 100. Meanwhile, with regard to the record REC12, the storage controller 110 may write part or all of the record REC12 including owner data in a physical area of the non-volatile memory 120.

The storage controller 110 may guarantee that owner data generated from the outside of the storage device 100 are generated time-sequentially for each owner identifier information and for each tag information, by determining validity of a record based on time information.

Figure 13:
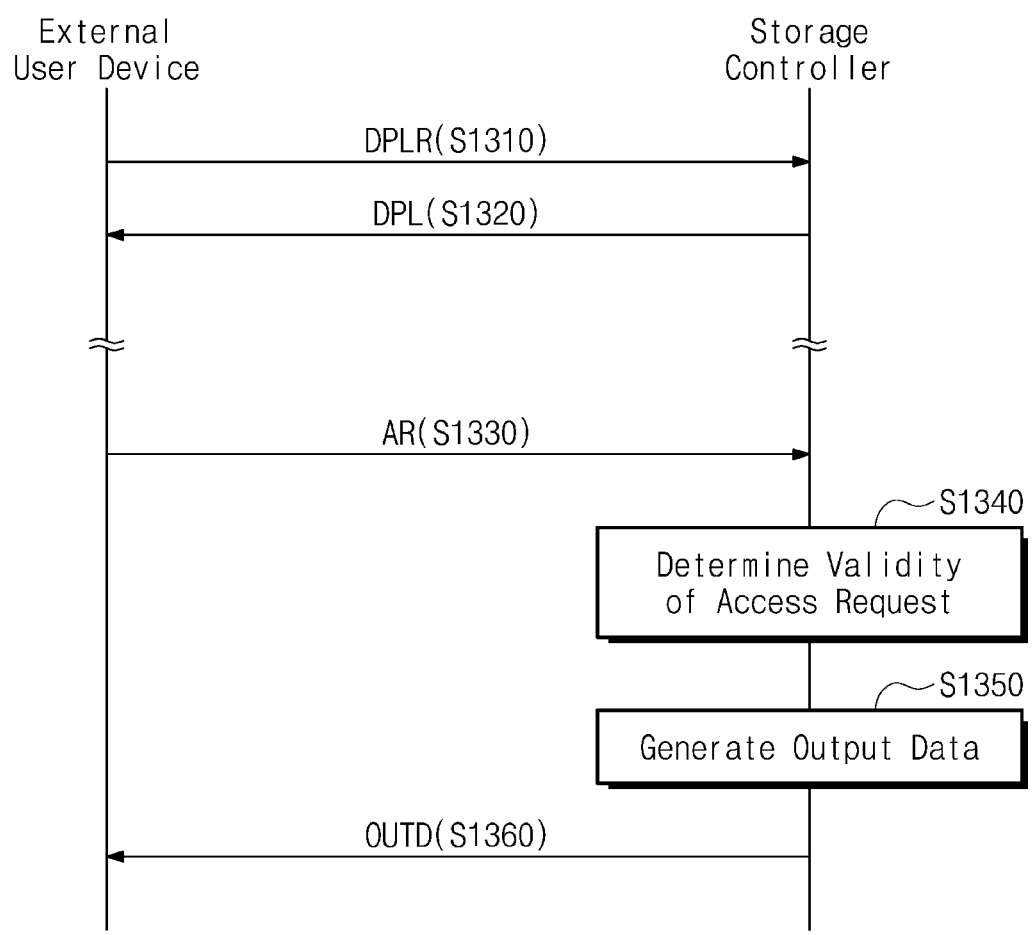
FIG. 13 is a diagram illustrating an operation in which a storage device receives an access request, according to an embodiment of the present disclosure.

FIG. 13 is a diagram illustrating an operation in which a storage device receives an access request, according to an embodiment of the present disclosure.

Referring to FIG. 13, the storage controller 110 may receive the access request AR including data processing information from the external user device (S1330). The storage controller 110 may determine validity of the access request AR based on the data processing information included in the access request AR and a data processing list (S1340).

The storage controller 110 may perform data processing with respect to owner data stored in the non-volatile memory 120 and may generate the output data OUTD through the data processing (S1350). The storage controller 110 may transmit the output data OUTD to the external user device (S1360).

As described with reference to FIG. 2, the data processing may refer to an operation that the storage controller 110 performs with respect to the owner data for the purpose of generating the output data OUTD that the external user device requests.

As the storage controller 110 performs the data processing with respect to the owner data corresponding to the access request AR instead of the external user device 2000, the burden on part or all of the operation to be performed by the external user device 2000 may be alleviated.

In an embodiment, the data processing may refer to various kinds of operations for calculating a statistical result such as average value calculation, sum calculation, counting of the number of times, maximum value calculation, and minimum value calculation for owner data. The data processing may also refer to various kinds of pre-processing operations for processing the owner data in the format appropriate for analysis or processing.

The storage device 100 may receive a data processing list request DPLR from the external user device (S1310).

The data processing list request DPLR refers to a request that the external user device transmits to the storage device 100 for the purpose of checking data processing executable by the storage controller 110.

The storage controller 110 may transmit a data processing list DPL being a list including data processing information corresponding to the executable data processing to the external user device (S1320).

As described above, the access request AR may include the data processing information. The storage controller 110 may determine the validity of the access request AR received from the outside.

When the data processing information included in the access request AR is present in the data processing list DPL, the storage controller 110 may determine that the access request AR is valid. When the data processing information included in the access request AR is absent from the data processing list DPL, the storage controller 110 may determine that the access request AR is not valid.

When the storage controller 110 determines that the access request AR is valid, the storage controller 110 may perform data processing corresponding to the data processing information with respect to the owner data corresponding to the access request AR. The storage controller 110 may generate the output data OUTD as a result of performing the data processing with respect to the owner data. The storage controller 110 may transmit the output data OUTD to the external user device.

When the storage controller 110 determines that the access request AR is not valid, the storage controller 110 may transmit the fail signal to the external user device 2000 as a response to the access request AR.

The data processing executable by the storage controller 110 may be added, deleted, or changed by a firmware update of the storage device 100. The data processing list DPL may also be updated by the firmware update.

The data processing list DPL may be stored in a firmware area or any other area of the non-volatile memory 120 and may be loaded to the random access memory 114 of the storage controller 110.

Figure 14:
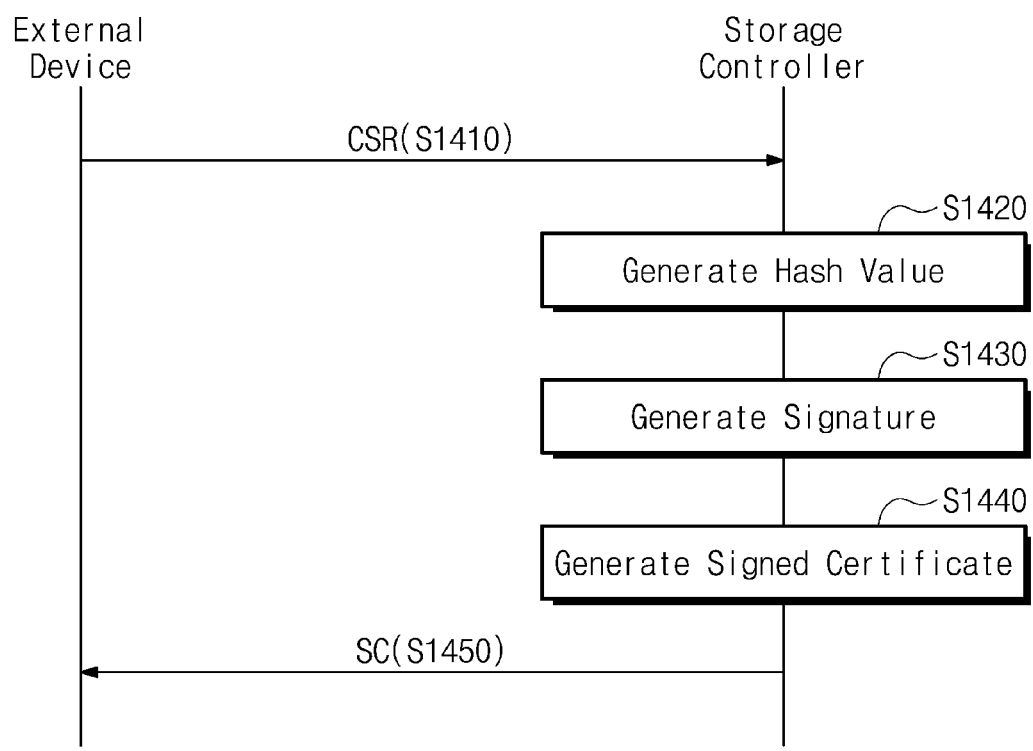
FIG. 14 is a diagram illustrating an operation in which a storage device generates a signed certificate, according to an embodiment of the present disclosure.

FIG. 14 is a diagram illustrating an operation in which a storage device generates a signed certificate, according to an embodiment of the present disclosure.

Referring to FIG. 14, the storage controller 110 of the storage device 100 may receive a certificate signature request CSR including entity information and a public key of an entity (S1410).

As described above, the entity is an individual accessing the storage device 100 through an external device (e.g., an external owner device or an external user device) and includes an owner and a user. The entity information may include entity identifier information and may further include additional information about the entity. The public key of the entity is one of an asymmetrical key pair generated by the external device of the storage device 100. An asymmetrical key pair consists of a public key and a private key.

The storage device 100 may generate a certificate of the entity that is used to verify a record or an access request received from the outside. The certificate of the entity may include the entity information and the public key of the entity.

The storage controller 110 may generate a hash value of the certificate by applying a hash function to the certificate of the entity (S1420).

The hash function refers to a function of mapping data of an arbitrary length to data of a fixed length. The storage controller 110 may generate a hash value of a fixed length by applying the hash function to specific data. The storage controller 110 may use various hash functions including an MD5 (Message-Digest algorithm 5) or SHA (Secure Hash Algorithm) series.

The storage controller 110 may generate a signature of the storage device 100 by encrypting the hash value of the certificate by using the private key of the storage device 100 (S1430).

The storage controller 110 may generate a signed certificate SC by including the signature of the storage device 100 in the certificate of the entity (S1440).

The storage controller 110 may transmit the signed certificate SC of the entity to the external device corresponding to the entity (S1450).

The signed certificate SC of the entity may be used to prove that the storage device 100 issues the certificate. That is, the storage controller 110 may verify the signed certificate SC through the signature of the storage device 100 included in the signed certificate SC of the entity. When the storage controller 110 verifies a record or an access request received from the outside, the storage controller 110 may use the public key of the entity included in the signed certificate SC.

Figure 15:
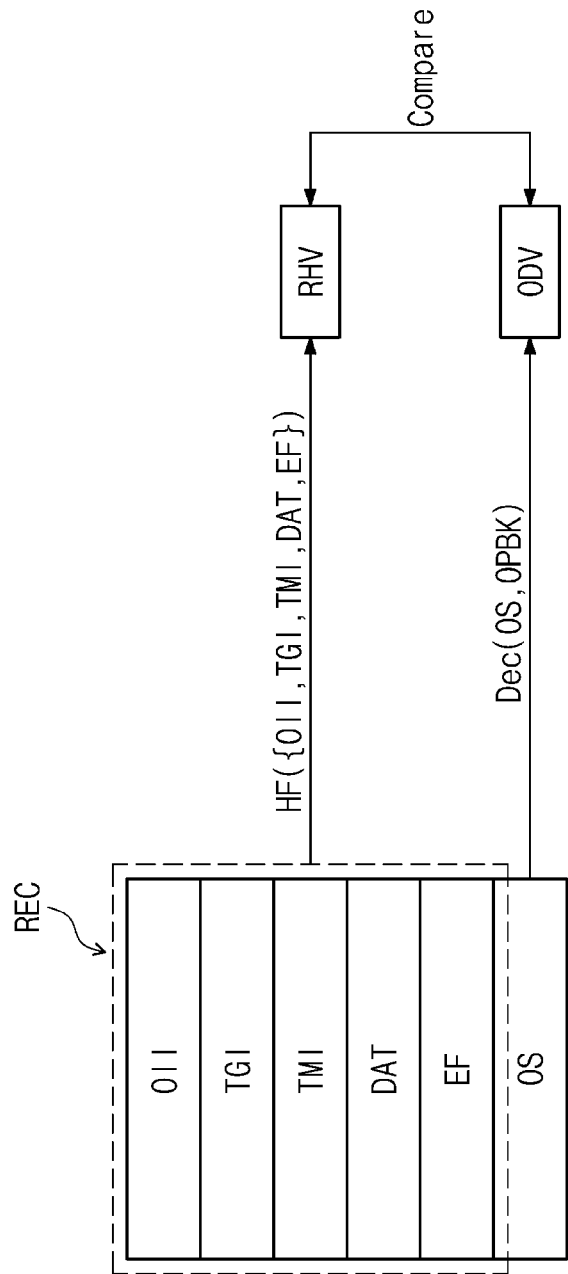
FIG. 15 is a diagram illustrating an operation in which a storage device verifies a received record, according to an embodiment of the present disclosure.

FIG. 15 is a diagram illustrating an operation in which a storage device verifies a received record, according to an embodiment of the present disclosure.

Referring to FIG. 15, the record REC may further include a signature OS of an owner. The storage controller 110 may verify the record REC based on the signature OS of the owner.

The signature OS of the owner may be added to the record REC by an external owner device. To add the signature OS of the owner to the record REC, the external owner device may generate a hash value of the record REC by applying a hash function HF to the owner identifier information OII, the tag information TGI, the time information TMI, and the owner data DAT. The external owner device may generate the signature OS of the owner by encrypting the hash value of the record REC by using a private key of the owner.

In the case where the record REC further includes an extra field EF, the external owner device may generate the hash value of the record REC by applying the hash function HF to the owner identifier information OII, the tag information TGI, the time information TMI, the owner data DAT, and the extra field EF. The external owner device may encrypt a hash value of a record by using a private key of an owner.

That is, the external owner device may generate a hash value of a record by applying the hash function HF to the remaining part of the record REC other than the signature OS of the owner.

The storage controller 110 may receive the record REC including the signature OS of the owner. To verify the record REC, the storage controller 110 may generate an owner decryption value ODV of the record REC by decrypting the signature OS of the owner by using a public key OPBK of the owner included in the signed certificate of the owner.

The storage controller 110 may generate a hash value RHV of the record REC by applying the hash function HF to the remaining part of the record REC other than the signature OS of the owner. The remaining part of the record REC other than the signature OS of the owner may include the owner identifier information OII, the tag information TGI, the time information TMI, and the owner data DAT. When the record REC further includes the extra field EF, the remaining part of the record REC other than the signature OS of the owner may include the owner identifier information OII, the tag information TG1, the time information TMI, the owner data DAT, and the extra field EF.

The storage controller 110 may compare the hash value RHV of the record REC and the owner decryption value ODV of the record REC. When the hash value RHV of the record REC and the owner decryption value ODV of the record REC coincide with each other, the storage controller 110 may determine validity of the record REC based on one or more of the owner identifier information OII, the tag information TGI, and the time information TMI. Afterwards, the storage controller 110 may store part or all of the record REC in the non-volatile memory 120.

When the hash value RHV of the record REC and the owner decryption value ODV of the record REC do not coincide with each other, the storage controller 110 may transmit the fail signal to the external owner device transmitting the record REC.

Figure 16:
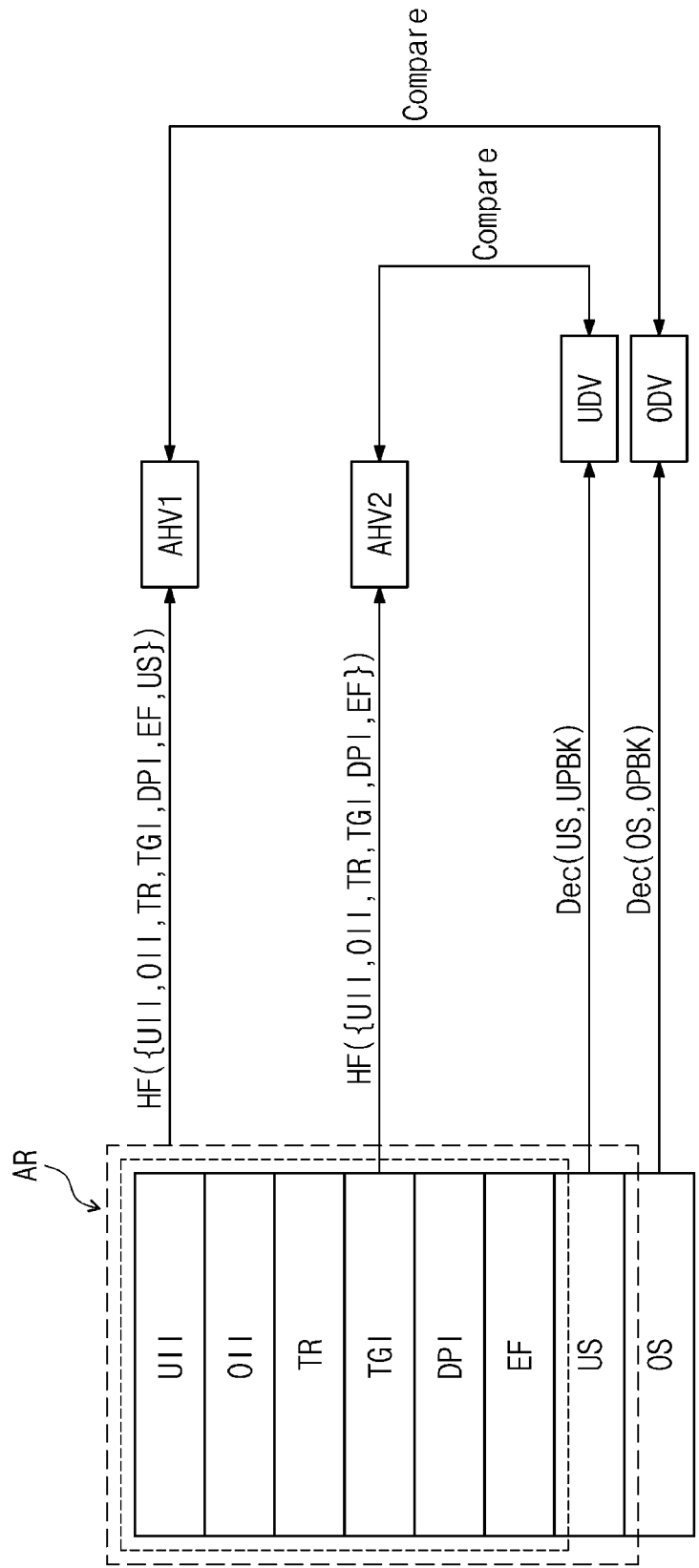
FIG. 16 is a diagram illustrating an operation in which a storage device verifies a received access request, according to an embodiment of the present disclosure.

FIG. 16 is a diagram illustrating an operation in which a storage device verifies a received access request, according to an embodiment of the present disclosure.

Referring to FIG. 16, the access request AR may further include a signature US of the user and the signature OS of the owner. The storage controller 110 may verify the access request AR based on the signature US of the user and the signature OS of the owner.

The signature US of the user may be added to the access request AR by an external user device. To add the signature US of the user to the access request AR, the external user device may generate a first hash value of the access request AR by applying the hash function HF to user identifier information UII, the owner identifier information OII, a time period TR, the tag information TG1, and data processing information DP1. The external user device may generate the signature US of the user by encrypting the first hash value of the access request AR by using a private key of the user.

In the case where the access request AR further includes the extra field EF, the external user device may generate the first hash value of the access request AR by applying the hash function HF to the user identifier information UII, the owner identifier information OII, the time period TR, the tag information TGI, the data processing information DP1, and the extra field EF. The external user device may encrypt the first hash value of the access request AR by using the private key of the user.

For example, the external user device may generate the first hash value of the access request AR by applying the hash function HF to the remaining part of the access request AR other than the signature US of the user and the signature OS of the owner.

The signature OS of the owner may be added to the access request AR by an external owner device. To add the signature OS of the user to the access request AR, the external owner device may generate a second hash value of the access request AR by applying the hash function HF to the user identifier information UII, the owner identifier information OII, the time period TR, the tag information TGI, the data processing information DPI, and the signature US of the user.

In the case where the access request AR further includes the extra field EF, the external owner device may generate the second hash value of the access request AR by applying the hash function HF to the user identifier information UII, the owner identifier information OII, the time period TR, the tag information TGI, the data processing information DPI, the extra field EF, and the signature US of the user. The external owner device may encrypt the second hash value of the access request AR by using the private key of the owner.

That is, the external owner device may generate the second hash value of the access request AR by applying the hash function HF to the remaining part of the access request AR other than the signature OS of the owner.

The storage controller 110 may receive the access request AR including the signature US of the user and the signature OS of the owner.

To verify the access request AR, the storage controller 110 may generate the owner decryption value ODV of the access request AR by decrypting the signature OS of the owner by using the public key OPBK of the owner included in the signed certificate of the owner.

The storage controller 110 may generate a first hash value AHV1 of the access request AR by applying the hash function HF to the remaining part of the access request AR other than the signature OS of the owner. The remaining part of the access request AR other than the signature OS of the owner may include the owner identifier information OII, the user identifier information UII, the tag information TGI, the data processing information DPI, and the signature US of the user. When the access request AR further includes the extra field EF, the remaining part of the access request AR other than the signature OS of the owner may include the user identifier information UII, the owner identifier information OII, the tag information TGI, the data processing information DPI, the extra field EF, and the signature US of the user.

The storage controller 110 may compare the first hash value AHV1 of the access request AR and the owner decryption value ODV of the access request AR. When the first hash value AHV1 of the access request AR and the owner decryption value ODV of the access request AR coincide with each other, the storage controller 110 may verify the access request AR based on the signature US of the user of the access request AR.

When the first hash value AHV1 of the access request AR and the owner decryption value ODV of the access request AR do not coincide with each other, the storage controller 110 may transmit the fail signal to the external user device transmitting the access request AR.

To verify the access request AR, the storage controller 110 may generate a user decryption value UDV of the access request AR by decrypting the signature US of the user by using a public key UPBK of the user included in the signed certificate of the user.

The storage controller 110 may generate a second hash value AHV2 of the access request AR by applying the hash function HF to the remaining part of the access request AR other than the signature OS of the owner and the signature US of the user. The remaining part of the access request AR other than the signature OS of the owner and the signature US of the user may include the user identifier information UII, the owner identifier information OII, the time period TR, the tag information TGI, and the data processing information DPI. When the access request AR further includes the extra field EF, the remaining part of the access request AR other than the signature US of the user and the signature OS of the owner may include the user identifier information UII, the owner identifier information OII, the time period TR, the tag information TGI, the data processing information DPI, and the extra field EF.

The storage controller 110 may compare the second hash value AHV2 of the access request AR and the user decryption value UDV of the access request AR. When the second hash value AHV2 of the access request AR and the user decryption value UDV of the access request AR coincide with each other, the storage controller 110 may verify the access request AR based on the data processing information of the access request AR. Afterwards, the storage controller 110 may generate output data by performing data processing corresponding to the data processing information DPI with respect to the owner data corresponding to the access request AR. The storage controller 110 may transmit the output data to the external user device.

When the second hash value AHV2 of the access request AR and the user decryption value UDV of the access request AR do not coincide with each other, the storage controller 110 may transmit the fail signal to the external user device transmitting the access request AR.

It may be obvious to one of ordinary skill in the art that the order of generating the first hash value AHV1 of the access request AR, the second hash value AHV2 of the access request AR, the owner decryption value ODV of the access request AR, and the user decryption value UDV of the access request AR and the order of comparing the first hash value AHV1 of the access request AR and the owner decryption value ODV of the access request AR and comparing the second hash value AHV2 of the access request AR and the user decryption value UDV of the access request AR may be variously changed.

Figure 17:
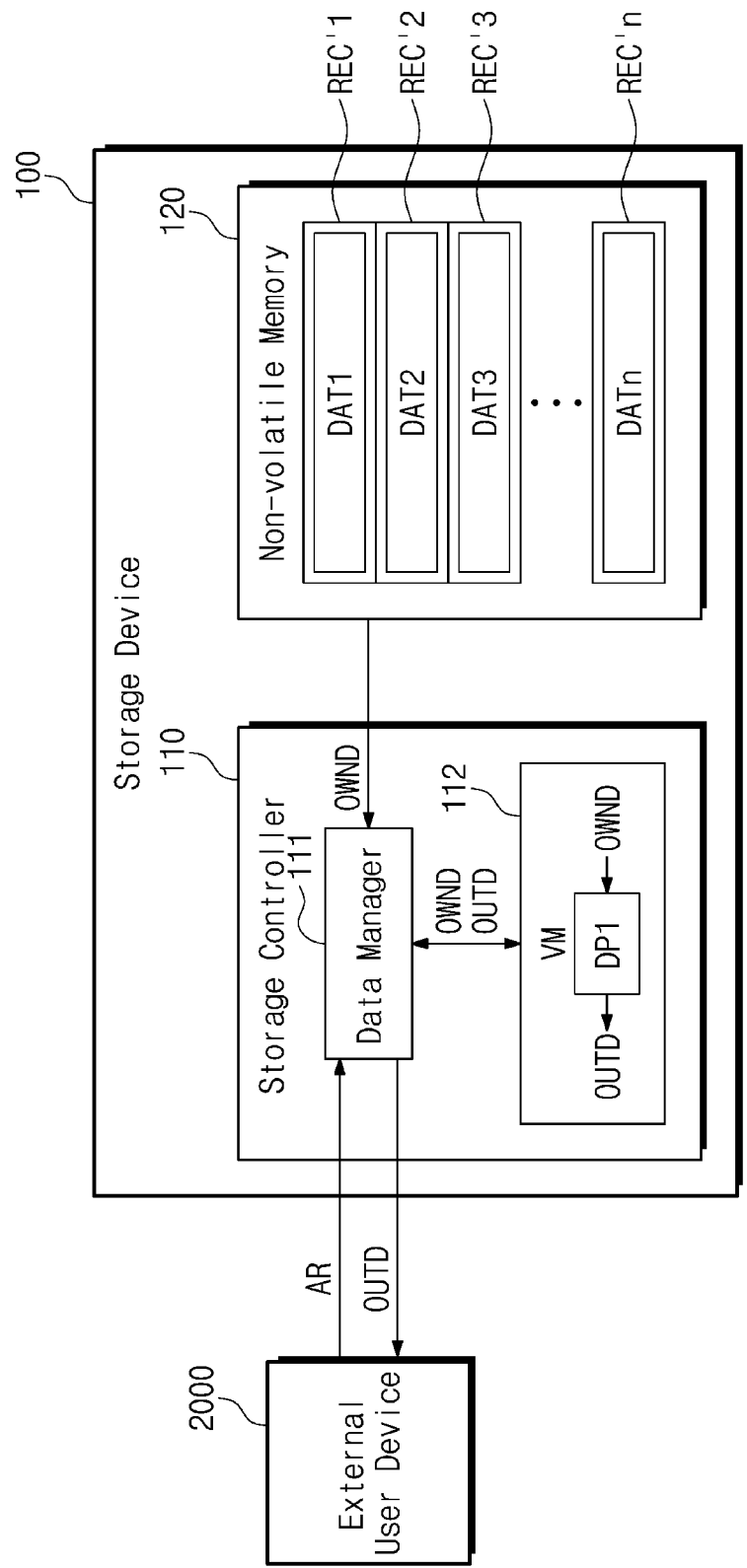
FIG. 17 is a diagram illustrating a storage cluster including a storage device according to an embodiment of the present disclosure.

FIG. 17 is a diagram illustrating a storage cluster including a storage device according to an embodiment of the present disclosure.

Referring to FIG. 17, the storage controller 110 may generate output data through the virtual machine 112.

The non-volatile memory 120 may store part or all REC'1, REC'2, ..., REC'n of respective records that the storage controller 110 receives. The part or all REC'1, REC'2, ..., REC'n of the respective records may include the owner data DAT1, DAT2, ..., DATn.

The storage controller 110 may receive the access request AR from the external user device 2000. The data manager 111 included in the storage controller 110 may access the owner data OWND targeted for data processing from among the owner data DAT1, DAT2, DATn stored in the non-volatile memory 120 in response to the received access request AR.

The storage controller 110 may drive (e.g., initialize) the virtual machine 112, which as discussed above, is an isolated environment implemented in the storage controller 110. The virtual machine 112 may use an allocated resource of the storage device 100. The virtual machine 112 may be independently driven on the storage controller 110 and may execute a separate operating system and/or a separate application program. The data manager 111 may input the owner data OWND targeted for data processing to the virtual machine 112.

The virtual machine 112 may perform data processing DP1 corresponding on the data processing information included in the access request AR. The virtual machine 112 may generate the output data OUTD as a result of the data processing DP1. The virtual machine 112 may return the output data OUTD to the data manager 111.

The data manager 111 may transmit the output data OUTD to the external user device 2000 through an external interface.

Figure 18:
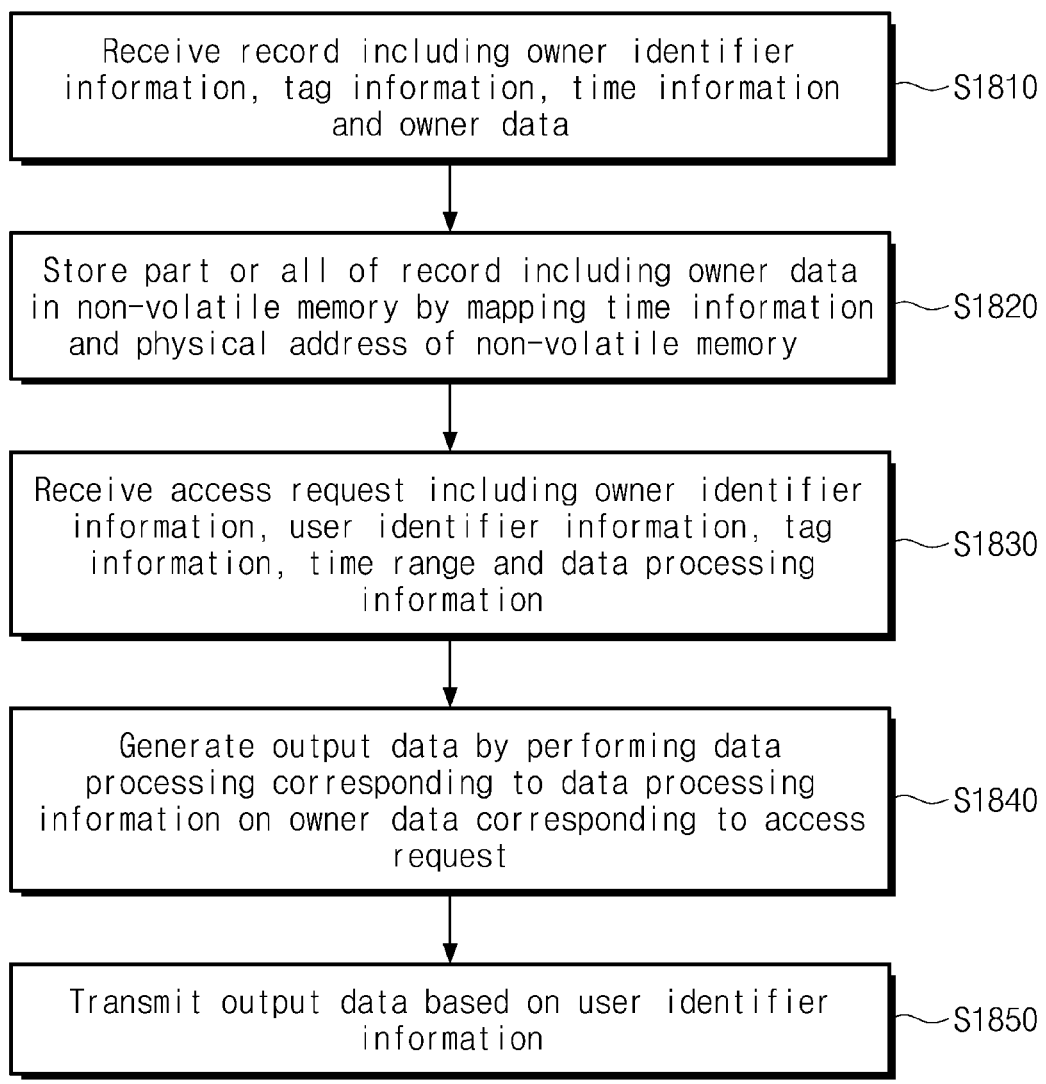
FIG. 18 is a flowchart illustrating an operation method of a storage device according to an embodiment of the present disclosure.

FIG. 18 is a flowchart illustrating an operation method of a storage device according to an embodiment of the present disclosure.

Referring to FIG. 18, the operation method of the storage device 100 may include receiving a record including owner identifier information, tag information for classifying owner data, time information being a time when owner data are generated, and the owner data (S1810).

Meanwhile, the operation method of the storage device 100 may include mapping the time information included in the received record to a physical address of a non-volatile memory and storing part or all of the record including the owner data in the non-volatile memory (S1820).

In this case, the storing of the part or all of the record in the non-volatile memory (S1820) may include updating a translation table mapping the time information and the physical address of the non-volatile memory and writing the part or all of the record including owner data in a physical area corresponding to the physical address of the non-volatile memory based on the translation table.

In this case, the translation table may include levels of a plurality of time information.

In this case, each of the levels of the plurality of time information may correspond to one of Year, Month, Day, Hour, Minute, and Second.

Meanwhile, the operation method of the storage device 100 may include receiving an access request including owner identifier information, user identifier information, tag information, a time period, and data processing information (S1830).

Meanwhile, the operation method of the storage device 100 may include generating output data by performing data processing corresponding to the data processing information with respect to the owner data corresponding to the time period included in the received access request (S1840).

In this case, the generating of the output data (S1840) may include accessing the physical area corresponding to the physical address mapped to time information included in the time period based on the translation table and searching for owner data in which owner identifier information and tag information of the physical area coincide with the owner identifier information and the tag information included in the access request.

Meanwhile, the generating of the output data (S1840) may include driving a virtual machine, inputting the owner data corresponding to the access request to the virtual machine and performing the data processing corresponding to the data processing information on the virtual machine.

Meanwhile, the operation method of the storage device 100 may include transmitting the output data based on the user identifier information (S1850).

Meanwhile, the operation method of the storage device 100 may further include receiving a certificate signature request including entity information including entity identifier information and an entity public key, generating a signed certificate in response to the received certificate signature request, and transmitting the signed certificate, with regard to an entity including an owner and a user.

Figure 19:
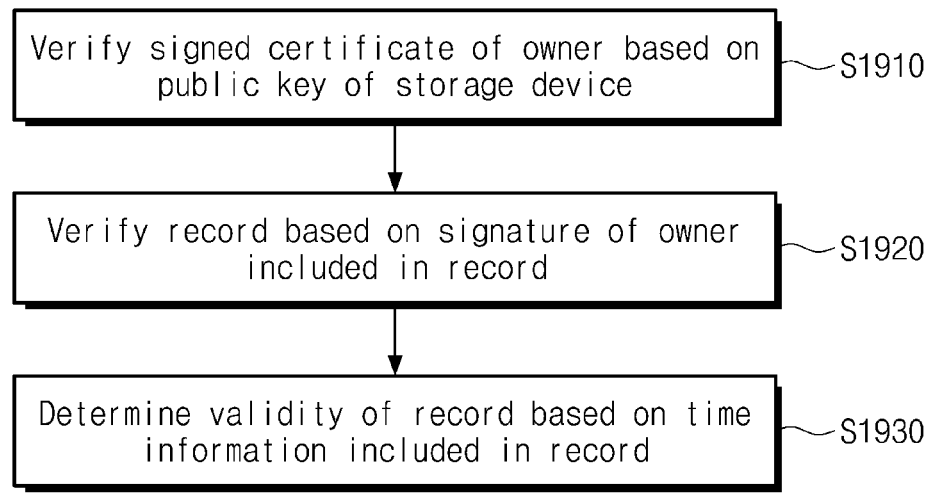
FIG. 19 is a flowchart illustrating an operation method of a storage device verifying a record, according to an embodiment of the present disclosure.

FIG. 19 is a flowchart illustrating an operation method of a storage device verifying a record, according to an embodiment of the present disclosure.

Referring to FIG. 19, the operation method of the storage device 100 may include verifying a signed certificate of an owner based on a public key of the storage device 100 (S1910).

Meanwhile, a record that the storage device 100 receives may further include a signature of the owner.

In this case, the operation method of the storage device 100 may include verifying the record based on the signature of the owner included in the record (S1920).

In this case, the verifying of the record (S1920) may include generating a decryption value of the signature of the owner of the record by decrypting the signature of the owner by using a public key of the owner, generating a hash value of the record by applying a hash function to part of the record including owner identifier information, tag information, time information, and owner data, and comparing the decryption value of the signature of the owner of the record and the hash value of the record.

Meanwhile, the hash function in the verifying of the record (S1920) is equal to the hash function used to generate the signature of the owner.

The operation method of the storage device 100 may include determining validity of the record based on the time information included in the record (S1930).

Figure 20:
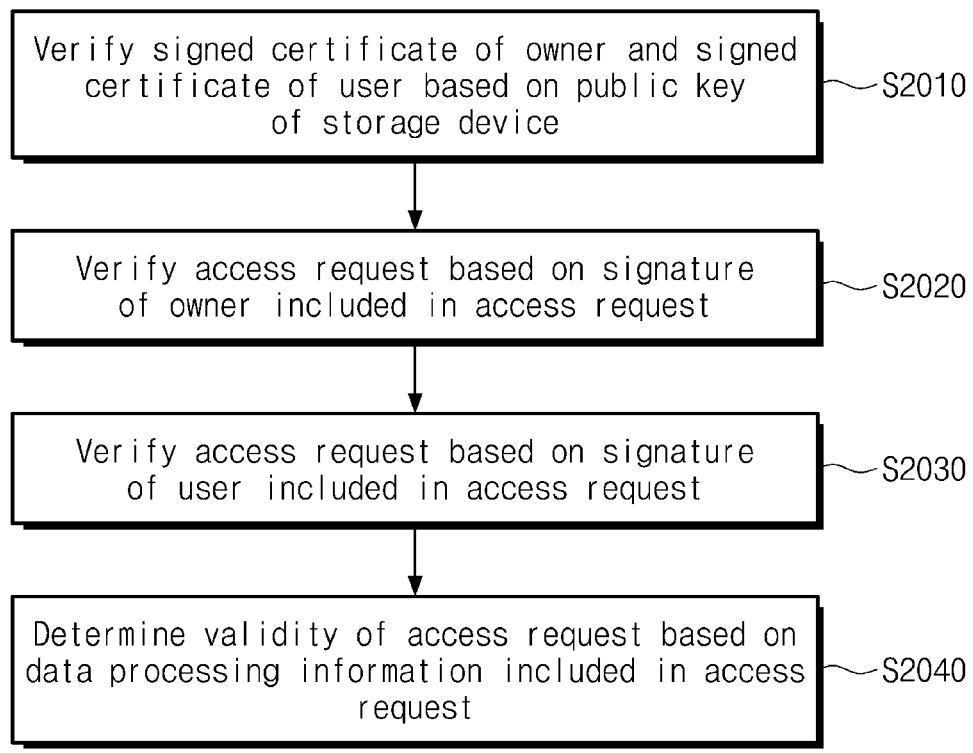
FIG. 20 is a flowchart illustrating an operation method of a storage device verifying an access request, according to an embodiment of the present disclosure.

FIG. 20 is a flowchart illustrating an operation method of a storage device verifying an access request, according to an embodiment of the present disclosure.

Referring to FIG. 20, the operation method of the storage device 100 may include verifying a signed certificate of an owner based on a public key of the storage device 100 (S2010).

Meanwhile, an access request that the storage device 100 receives may further include a signature of the owner and a signature of a user.

In this case, the operation method of the storage device 100 may include verifying the access request based on the signature of the owner included in the access request (S2020).

In this case, the verifying of the access request based on the signature of the owner (S2020) may include generating a decryption value of the signature of the owner of the access request by decrypting the signature of the owner by using a public key of the owner, generating a first hash value of the access request by applying a hash function to part of the access request including user identifier information, owner identifier information, a time period, tag information, data processing information, and the signature of the user, and comparing the decryption value of the signature of the owner and the first hash value of the access request.

The operation method of the storage device 100 may include verifying the access request based on the signature of the user included in the access request (S2030).

In this case, the verifying of the access request based on the signature of the user (S2030) may include generating a decryption value of the signature of the user of the access request by decrypting the signature of the user by using a public key of the user, generating a second hash value of the access request by applying the hash function to part of the access request including user identifier information, owner identifier information, a time period, tag information, and data processing information, and comparing the decryption value of the signature of the user of the access request and the second hash value of the access request.

The hash function used in the verifying of the access request based on the signature of the owner (S2020) and the verifying of the access request based on the signature of the user (S2030) is equal to a hash function used to generate the signature of the owner and the signature of the user.

The operation method of the storage device 100 may include verifying validity of the access request based on the data processing information included in the access request (S2040).

According to an embodiment of the present disclosure, a storage device may manage owner data received from the outside, based on time information. As the storage device performs data processing with respect to owner data corresponding to an access request received from the outside, the burden of the operation to be performed outside the storage device may be alleviated.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a storage device comprising:
   receiving a record including owner identifier information, tag information for classifying owner data, time information indicating a time when the owner data are generated, and the owner data;
   mapping the time information included in the received record to a physical address of a non-volatile memory;
   storing part or all of the record including the owner data to the mapped physical address of the non-volatile memory;
   receiving an access request including owner identifier information, user identifier information, tag information, a time period, and data processing information;
   generating output data by performing data processing corresponding to the data processing information with respect to owner data corresponding to the time period included in the received access request; and
   transmitting the output data based on the user identifier information.

2. The method of claim 1, wherein the storing of the part or all of the record in the non-volatile memory includes:
   updating a translation table such that the time information is mapped to the physical address of the non-volatile memory; and
   writing the part or all of the record including the owner data in a physical area corresponding to the mapped physical address of the non-volatile memory, based on the translation table.

3. The method of claim 2, wherein the translation table includes levels of a plurality of time information.

4. The method of claim 3, wherein each of the levels of the plurality of time information corresponds to one of Year, Month, Day, Hour, Minute, and Second.

5. The method of claim 2, wherein the generating of the output data includes:
   accessing the physical area corresponding to the physical address mapped to the time information included in the time period based on the translation table; and
   searching for owner data in which owner identifier information and tag information of the physical area coincide with the owner identifier information and the tag information included in the access request.

6. The method of claim 1, further comprising:
   determining validity of the received record by comparing the time information of the received record with time information of a latest record, in which owner identifier information and tag information coincide with those of the received record, from among one or more records whose part or all are previously stored in the non-volatile memory.

7. The method of claim 1, further comprising:
   determining validity of the received record based on the data processing information included in the access request and a data processing list including pieces of data processing information corresponding to executable data processing.

8. The method of claim 1, further comprising:
   receiving a certificate signature request with regard to an entity being one of an owner and a user, the certificate signature request including entity information including entity identifier information and a public key of the entity;
   generating a signed certificate in response to the received certificate signature request; and
   transmitting the signed certificate.

9. The method of claim 8, wherein the received record further includes a signature of the owner, and
   wherein the method further comprises:
   verifying the record based on the signature of the owner.

10. The method of claim 9, wherein the verifying of the record includes:
    generating a decryption value of the signature of the owner by decrypting the signature of the owner by using a public key of the owner;
    generating a hash value of the record by applying a hash function to part of the record including the owner identifier information, the tag information, the time information, and the owner data; and
    comparing the decryption value of the signature of the owner and the hash value of the record.

11. The method of claim 8, wherein the access request further includes a signature of the user and a signature of the owner, and
    wherein the method further comprises:
    verifying the access request based on the signature of the user and the signature of the owner.

12. The method of claim 11, wherein the verifying of the access request includes:
    generating a decryption value of the signature of the owner by decrypting the signature of the owner by using a public key of the owner;
    generating a first hash value of the access request by applying a hash function to part of the access request including the user identifier information, the owner identifier information, the time period, the tag information, the data processing information, and the signature of the user;
    comparing a decryption value of the signature of the owner and the first hash value of the access request;
    generating a decryption value of the signature of the user by decrypting the signature of the user by using a public key of the user;
    generating a second hash value of the access request by applying a hash function to part of the access request including the user identifier information, the owner identifier information, the time period, the tag information, and the data processing information; and
    comparing the decryption value of the signature of the user and the second hash value of the of the access request.

13. The method of claim 1, wherein the generating of the output data includes:
    driving a virtual machine;
    inputting the owner data corresponding to the access request to the virtual machine; and
    performing the data processing corresponding to the data processing information with respect to the owner data corresponding to the access request through the virtual machine.

14. The method of claim 1, wherein the record further includes an extra field.

15. A storage device comprising:
a non-volatile memory configured to store data; and
a storage controller configured to:
receive a record including owner identifier information, tag information for classifying owner data, time information indicating a time when the owner data are generated, and the owner data;
map the time information included in the record to a physical address of the non-volatile memory;
storing part or all of the record including the owner data to the mapped physical address of the non-volatile memory;
receive an access request including owner identifier information, user identifier information, tag information, a time period, and data processing information;
generate output data by performing data processing corresponding to the data processing information with respect to owner data corresponding to the time period included in the access request; and
transmit the output data based on the user identifier information.

16. The storage device of claim 15, wherein the record further includes a signature of an owner, and
wherein the storage controller verifies the record based on the signature of the owner.

17. The storage device of claim 15, wherein the access request further includes a user signature and an owner signature, and
wherein the storage controller verifies the access request based on the user signature and the owner signature.

18. A storage controller comprising:
an external interface configured to communicate with the outside;
a non-volatile memory interface configured to communicate with a non-volatile memory; and
a processor configured to:
receive a record including owner identifier information, tag information for classifying owner data, time information indicating a time when the owner data are generated, and the owner data through the external interface;
map the time information included in the received record to a physical address of the non-volatile memory;
store part or all of the record including the owner data to the mapped physical address of the non-volatile memory through the non-volatile memory interface;
read owner data corresponding to an access request received through the external interface based on user identifier information, tag information, and a time period included in the access request;
generate output data by performing data processing corresponding to data processing information included in the access request with respect to the read owner data; and
transmit the output data to the outside through the external interface based on the user identifier information included in the access request.

19. The storage controller of claim 18, wherein the record further includes an owner signature, and
wherein the processor verifies the record based on the owner signature.

20. The storage controller of claim 18, wherein the access request further includes a user signature and an owner signature, and
wherein the processor verifies the access request based on the user signature and the owner signature.

* * * * *